US012800910B2

(12) United States Patent
Takada

(10) Patent No.: US 12,800,910 B2
(45) Date of Patent: Nov. 17, 2026

(54) OPTICAL PATH CONTROL DEVICE, DISPLAY DEVICE, AND OPTICAL PATH CONTROL METHOD

(71) Applicant: JVCKENWOOD Corporation, Yokohama (JP)

(72) Inventor: Hiroyuki Takada, Yokohama (JP)

(73) Assignee: JVCKENWOOD Corporation, Yokohama (JP)

( * ) Notice: Subject to any disclaimer, the term of this patent is extended or adjusted under 35 U.S.C. 154(b) by 392 days.

(21) Appl. No.: 18/441,005

(22) Filed: Feb. 14, 2024

(65) Prior Publication Data

US 2024/0184099 A1 Jun. 6, 2024

Related U.S. Application Data

(63) Continuation of application No. PCT/JP2022/035422, filed on Sep. 22, 2022.

(30) Foreign Application Priority Data

Sep. 27, 2021 (JP) ................................ 2021-156718
Sep. 28, 2021 (JP) ................................ 2021-157894
Sep. 28, 2021 (JP) ................................ 2021-158018
Sep. 20, 2022 (JP) ................................ 2022-148701

(51) Int. Cl.
*G02B 26/08* (2006.01)
*G02B 26/10* (2006.01)

(52) U.S. Cl.
CPC ....... *G02B 26/0875* (2013.01); *G02B 26/101* (2013.01)

(58) Field of Classification Search
CPC .. G02B 26/0875; G02B 26/101; G02B 26/08; G02B 27/0172; G03B 21/00; G03B 21/14; G09G 3/20; G09G 3/36; H04N 5/74
See application file for complete search history.

(56) References Cited

U.S. PATENT DOCUMENTS

2016/0091773 A1 3/2016 Mizoguchi et al.
2020/0174246 A1 6/2020 Wakabayashi et al.
2020/0371402 A1 * 11/2020 Hirakura ............ G02B 26/0833

FOREIGN PATENT DOCUMENTS

JP 3863445 12/2006
JP 2015-176019 10/2015
JP 2016-71232 5/2016
(Continued)

OTHER PUBLICATIONS

English translation of JP-2015176019-A (Year: 2015).*
(Continued)

*Primary Examiner* — Tulsidas C Patel
*Assistant Examiner* — Joshua Kiel M Rodriguez
(74) *Attorney, Agent, or Firm* — Amin, Turocy & Watson, LLP

(57) ABSTRACT

An optical path control device includes a swing unit including an optical unit on which light is made incident, a first swing unit that supports the optical unit, and a second swing unit that swingably supports the first swing unit, a first actuator that swings the swing unit centering on a first swing axis, a second actuator that swings the swing unit centering on a second swing axis that intersects the first swing axis, and a drive unit that applies a drive signal of a current value to the first actuator and the second actuator.

11 Claims, 21 Drawing Sheets

(56) References Cited

FOREIGN PATENT DOCUMENTS

| | | |
|---|---|---|
| JP | 2016-71233 | 5/2016 |
| JP | 2017-220810 | 12/2017 |
| JP | 2020-91343 | 6/2020 |

OTHER PUBLICATIONS

International Search Report and Written Opinion for International Application No. PCT/JP2022/035422 mailed on Dec. 13, 2022, 9 pages.

* cited by examiner

OPTICAL PATH CONTROL DEVICE, DISPLAY DEVICE, AND OPTICAL PATH CONTROL METHOD

CROSS-REFERENCE TO RELATED APPLICATIONS

This application is a Continuation of PCT International Application No. PCT/JP2022/035422 filed on Sep. 22, 2022 which claims the benefit of priority from Japanese Patent Application No. 2021-156718 filed on Sep. 27, 2021, Japanese Patent Application No. 2021-157894 filed on Sep. 28, 2021, Japanese Patent Application No. 2021-158018 filed on Sep. 28, 2021 and Japanese Patent Application No. 2022-148701 filed on Sep. 20, 2022, the entire contents of all of which are incorporated herein by reference.

BACKGROUND

1. Technical Field

The present disclosure relates to an optical path control device, a display device, and an optical path control method.

2. Description of the Related Art

There is known an optical device that shifts an optical axis by swinging an optical unit on which light is made incident. For example, Japanese Patent Application Laid-open No. 2020-091343 below describes a technique that can set the resolution of an image to be projected higher than the resolution of light modulation device by swinging an optical unit to shift an optical path of light transmitted through the optical unit.

There is known an optical device that shifts an optical path of light transmitted through an optical unit by swinging the optical unit respectively centering on a first axis and a second axis intersecting the optical unit. Such an optical device includes a first actuator that swings the optical unit around a first axis and a second actuator that swings the optical unit around a second axis. The optical path is changed by inclining the optical unit in a predetermined direction by a predetermined angle by simultaneously driving the two actuators. In this case, since the two actuators are simultaneously driven, power consumption increases. In addition, at this time, it is necessary to adjust the balance between driving amounts of the two actuators, that is, displacement amounts for inclining the optical unit. There is a problem that adjustment control for the actuators becomes complicated.

SUMMARY

An optical path control device according to an embodiment of the present disclosure includes a swing unit including an optical unit on which light is made incident, a first swing unit that supports the optical unit, and a second swing unit that swingably supports the first swing unit, a first actuator that swings the swing unit centering on a first swing axis, a second actuator that swings the swing unit centering on a second swing axis intersecting the first swing axis, and a drive unit that applies a drive signal of a current value to the first actuator and the second actuator. When applying a drive signal for setting the current value to a preset predetermined current value to one of the first actuator and the second actuator to maintain the first swing unit or the second swing unit in an inclined position inclined with respect to a reference position, the drive unit applies a drive signal for setting the current value to 0 to another to maintain the first swing unit or the second swing unit in the reference position.

A display device according to an embodiment of the present disclosure includes the optical path control device, and an irradiation device that irradiates the optical unit with light.

An optical path control method according to an embodiment for controlling an optical path by applying a drive signal of a current value to a first actuator that swings, centering on a first swing axis, a first swing unit supporting an optical unit on which light is made incident and a second actuator that swings, centering on a second swing axis intersecting the first swing axis, a second swing unit that swingably supports the first swing unit is disclosed. The optical path control method includes when applying a drive signal for setting the current value to a preset predetermined current value to one of the first actuator and the second actuator to maintain the first swing unit or the second swing unit in an inclined position inclined with respect to a reference position, applying a drive signal for setting the current value to 0 to another to maintain the first swing unit or the second swing unit in the reference position.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Embodiments of the present disclosure are explained in detail below with reference to the drawings. Note that the present disclosure is not limited by the embodiments explained below.

First Embodiment

Schematic Configuration of a Display Device

Figure 1:
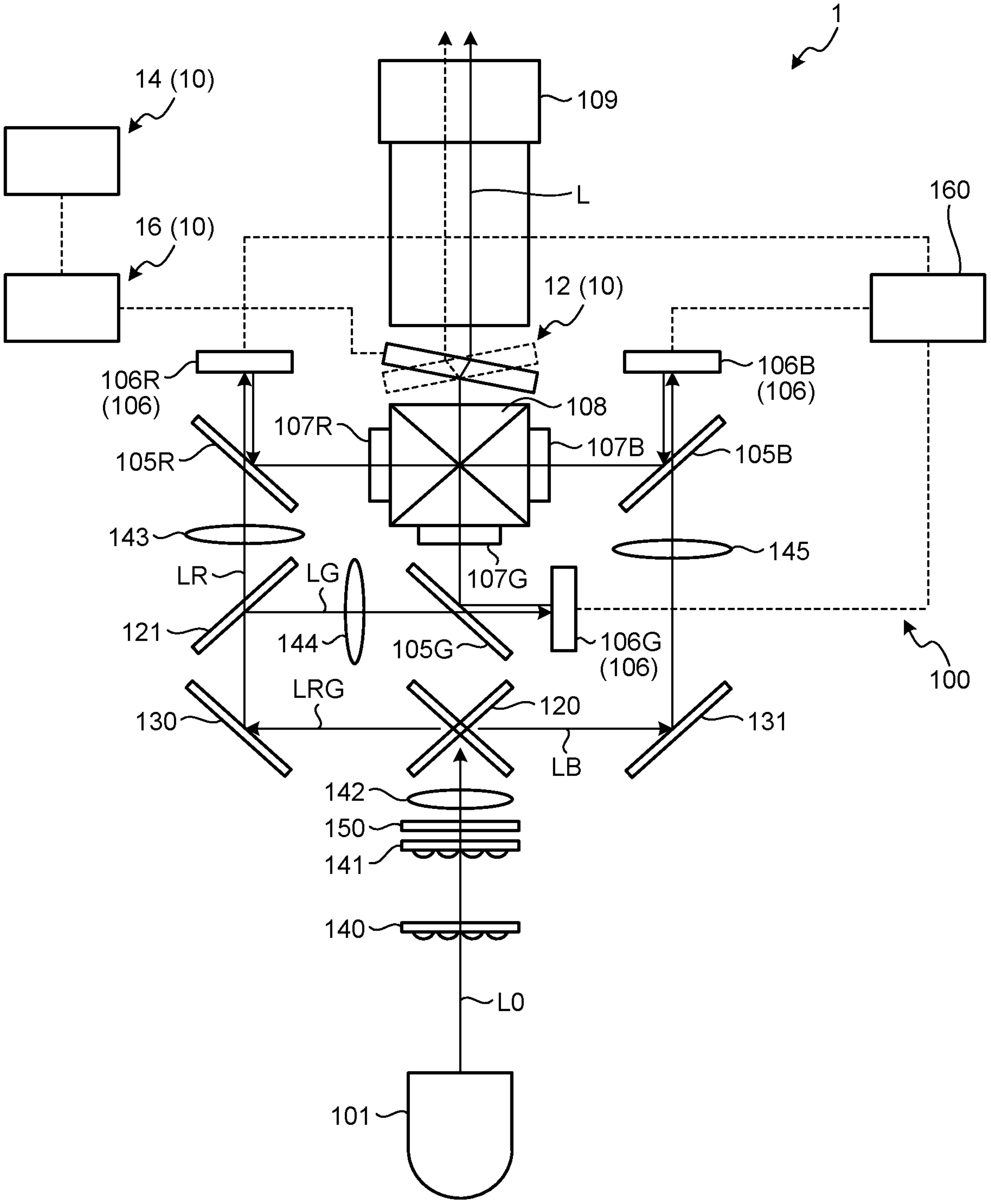
FIG. 1 is a schematic diagram illustrating a display device according to a first embodiment.

FIG. 1 is a schematic diagram of a display device according to a first embodiment.

In the first embodiment, as illustrated in FIG. 1, a display device 1 includes an optical path control device 10 and an irradiation device 100. The irradiation device 100 is a device that irradiates light L for an image. The optical path control device 10 is a device that controls an optical path of the light L. The optical path control device 10 shifts an optical axis of the light L to thereby shift the position of the image displayed by the light L and sets the resolution of a projected image higher than the resolution of the image by the irradiation device 100 (that is, the number of pixels of a display element 106 explained below).

The irradiation device 100 includes a light source 101, polarizing plates 105R, 105G, and 105B, display elements 106R, 106G, and 106B, polarizing plates 107R, 107G, and 107B, a color combining prism 108, a projection lens 109, dichroic mirrors 120 and 121, reflection mirrors 130 and 131, lenses 140, 141, 142, 143, 144, and 145, a polarization conversion element 150, and a video signal processing circuit 160. When the display element 106R, the display element 106G, and the display element 106B are not distinguished, the display element 106R, the display element 106G, and the display element 106B are described as the display element 106.

The light source 101 is a light source that generates and emits light. The light source 101 emits incident light L0. In the following explanation, using one light source 101 as a light source that emits the incident light L0 is explained as an example. However, another optical device for generating the incident light L0 may be included.

The incident light L0 from the light source 101 is made incident on the lens 140. The lens 140 and the lens 141 are, for example, fly-eye lenses. An illumination distribution of the incident light L0 is uniformized by the lenses 140 and 141 and the incident light L0 is made incident on the polarization conversion element 150. The polarization conversion element 150 is an element that aligns the polarization of the incident light L0 and includes, for example, a polarization beam splitter and a retardation plate. For example, the polarization conversion element 150 aligns the incident light L0 to p-polarized light.

The dichroic mirror 120 is irradiated with the incident light L0, the polarization of which is aligned by the polarization conversion element 150, via the lens 142. The lens 142 is, for example, a condenser lens.

The dichroic mirror 120 separates the incident light L0 into yellow light LRG and blue light LB including a blue band component. The yellow illumination light LRG separated by the dichroic mirror 120 is reflected by the reflection mirror 130 and is made incident on the dichroic mirror 121.

The dichroic mirror 121 separates the incident yellow light LRG into red light LR including a red band component and green light LG including a green band component.

The polarizing plate 105R is irradiated with, via the lens 143, the red light LR separated by the dichroic mirror 121. The polarizing plate 105G is irradiated with, via the lens 144, the green light LG separated by the dichroic mirror 121. The blue light LB separated by dichroic mirror 120 is reflected by the reflection mirror 131. The polarizing plate 105B is irradiated with the blue light LB via the lens 145.

The polarizing plates 105R, 105G, and 105B have a characteristic of reflecting one of the s-polarized light and the p-polarized light and transmitting the other. For example, the polarizing plates 105R, 105G, and 105B reflect the s-polarized light and transmit the p-polarized light. The polarizing plates 105R, 105G, and 105B are also referred to as reflective polarizing plates.

The red light LR, which is the p-polarized light, is transmitted through the polarizing plate 105R. The display element 106R is irradiated with the red light LR. The green light LG, which is the p-polarized light, is transmitted through the polarizing plate 105G. The display element 106G is irradiated with the green light LG. The blue light LB, which is the p-polarized light, is transmitted through polarizing plate 105B. The display element 106B is irradiated with the blue light LB.

The display element 106R, the display element 106G, and the display element 106B are, for example, reflective liquid crystal display elements. In the following explanation, a case in which the display element 106R, the display element 106G, and the display element 106B are reflective liquid crystal display elements is explained as an example. However, the display element 106R, the display element 106G, and the display element 106B are not limited to the reflective type. Transmissive liquid crystal display elements may be used. The above can be various applied to configurations in which other display elements are used instead of the liquid crystal display elements.

The display element 106R is controlled by the video signal processing circuit 160. The video signal processing circuit 160 controls to drive the display element 106R based on image data of a red component. The display element 106R optically modulates p-polarized red light LR according to the control of the video signal processing circuit 160 and generates s-polarized red light LR. The display element 106G is controlled by the video signal processing circuit 160. The video signal processing circuit 160 controls to drive the display element 106G based on image data of a green component. The display element 106G optically modulates p-polarized green light LG according to the control of the video signal processing circuit 160 and generates s-polarized green light LG. The display element 106B is controlled by the video signal processing circuit 160. The video signal processing circuit 160 controls to drive the display element 106B based on image data of a blue component. The display element 106B optically modulates p-polarized blue light LB based on image data of a blue component under the control of the video signal processing circuit 160 and generates s-polarized blue light LB.

The polarizing plates 107R, 107G, and 107B have a characteristic of transmitting one of the s-polarized light and the p-polarized light and reflecting or absorbing the other. For example, the polarizing plates 107R, 107G, and 107B transmit the s-polarized light and absorb unnecessary p-polarized light.

The s-polarized red light LR generated by the display element 106R is reflected by the polarizing plate 105R, transmitted through the polarizing plate 107R, and applied to the color combining prism 108. The s-polarized green light LG generated by the display element 106G is reflected by the polarizing plate 105G, transmitted through the polarizing plate 107G, and applied to the color combining prism 108. The s-polarized blue light LB generated by the display element 106B is reflected by the polarizing plate 105B, transmitted through the polarizing plate 107B, and applied to the color combining prism 108.

The color combining prism 108 combines the red light LR, the green light LG, and the blue light LB made incident thereon and emits the combined light to the projection lens 109 as light L for image display. The light L is projected onto a not-illustrated screen or the like via the projection lens 109.

Note that, although the irradiation device 100 has the above configuration, the configuration is not limited to the above explanation and may be any configuration.

The optical path control device 10 includes an optical path control mechanism 12, a control circuit (a control unit) 14, and a drive circuit (a drive unit) 16. The optical path control mechanism 12 is a mechanism that swings by being driven by the drive circuit 16. The optical path control mechanism 12 is provided between the color combining prism 108 and the projection lens 109 in the direction along the optical path of the light L. When the light L from the color combining prism 108 is made incident and swings, the optical path control mechanism 12 shifts the traveling direction (the optical path) of the light L and emits the light L toward the projection lens 109. As explained above, the optical path control device 10 controls the optical path of the light L such that the optical path of the light L shifts. Note that a position where the optical path control mechanism 12 is provided is not limited to a position between the color combining prism 108 and the projection lens 109 and may be any position.

Functional Configuration of the Display Device

Figure 2:
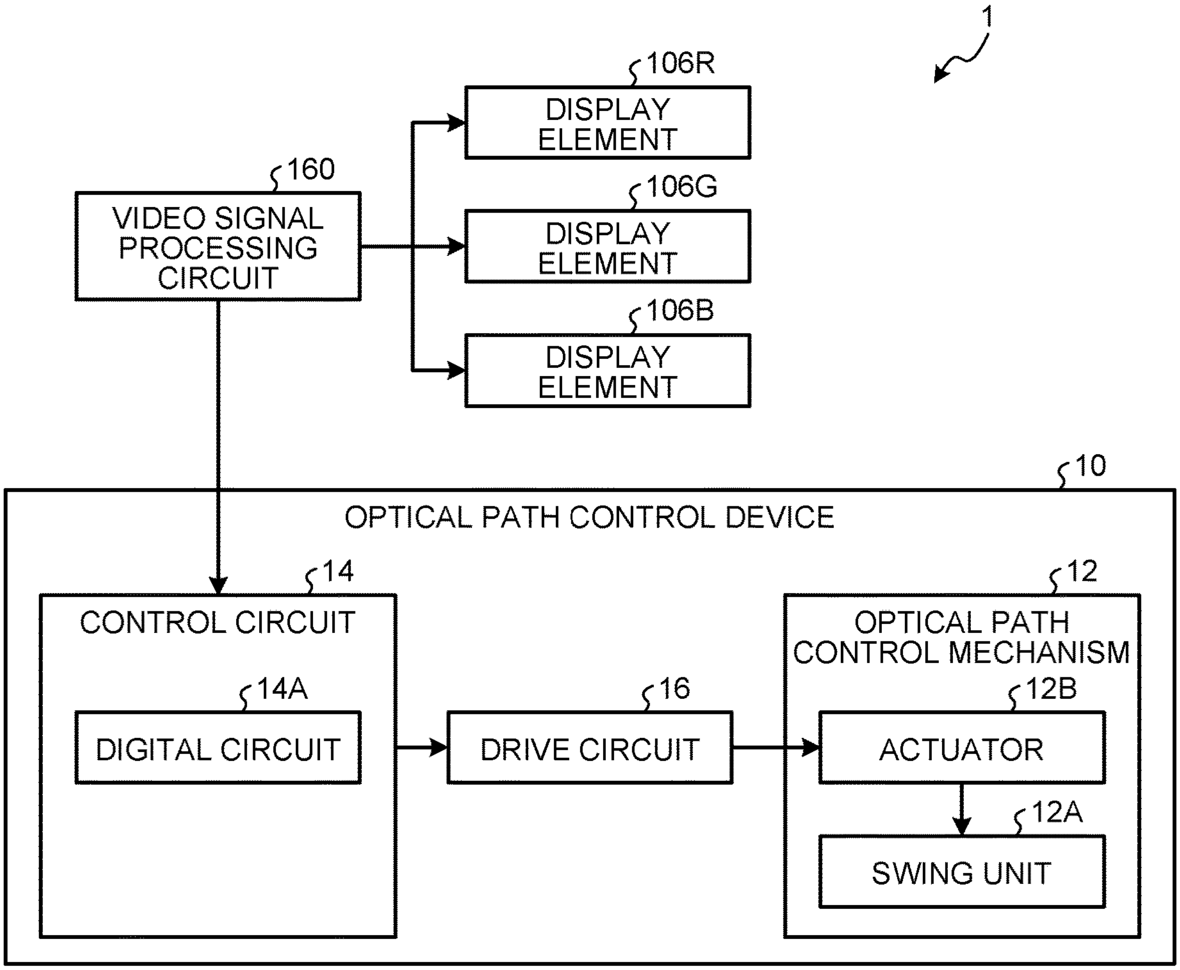
FIG. 2 is a block diagram schematically illustrating a circuit configuration of the display device.

FIG. 2 is a block diagram schematically illustrating a circuit configuration of the display device.

As illustrated in FIG. 2, the video signal processing circuit 160 controls the display elements 106R, 106B, and 106G. A video signal including image data for controlling the display elements 106R, 106B, and 106G and a synchronization signal is input to the video signal processing circuit 160. The video signal processing circuit 160 controls the display elements 106R, 106B, and 106G based on the image data while synchronizing timing based on the synchronization signal. The control circuit 14 includes a digital circuit 14A. A synchronization signal from the video signal processing circuit 160 is input to the digital circuit 14A. The digital circuit 14A generates, while synchronizing timing based on the synchronization signal, a digital drive signal for driving the optical path control mechanism 12. The drive circuit 16 receives input of the digital drive signal generated by the digital circuit 14A, amplifies the digital drive signal, and outputs the amplified digital drive signal to an actuator 12B of the optical path control mechanism 12 explained below. The actuator 12B is driven in response to the drive signal to swing a swing unit 12A (see FIG. 3) explained below.

Optical Path Control Mechanism

Figure 3:
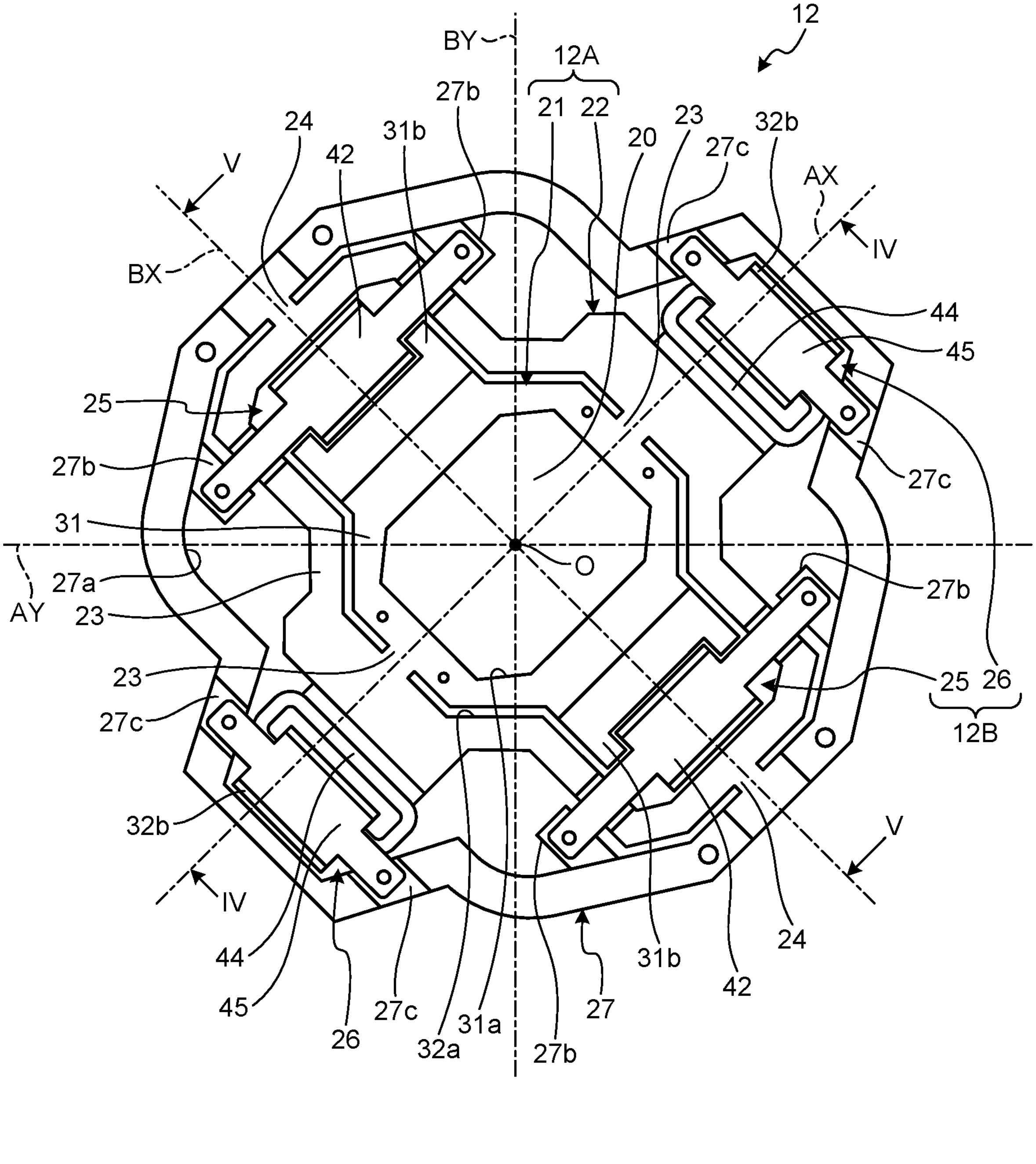
FIG. 3 is a plan view illustrating an optical path control mechanism.
Figure 4:
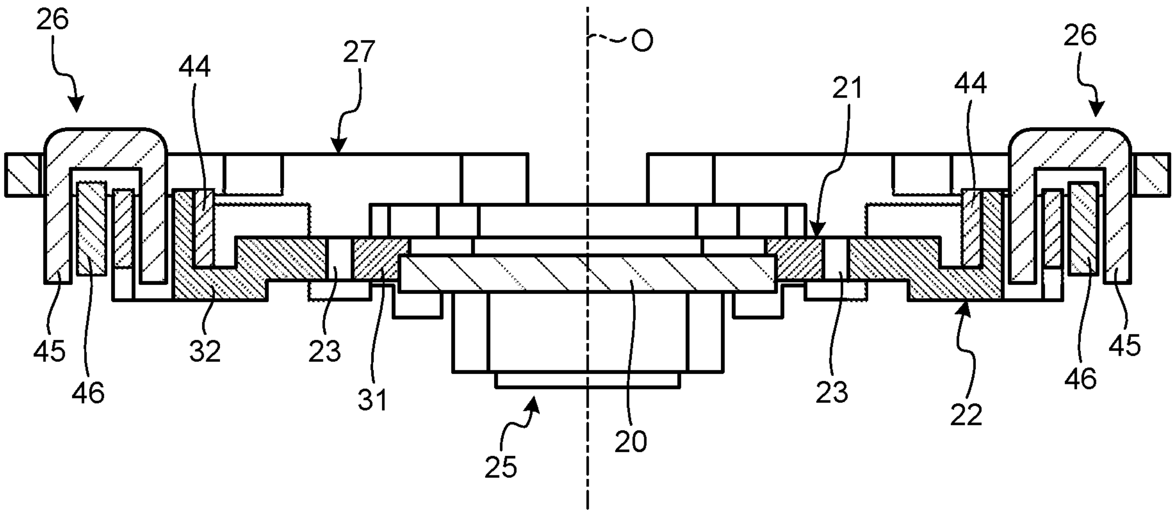
FIG. 4 is a IV-IV sectional view of FIG. 3.
Figure 5:
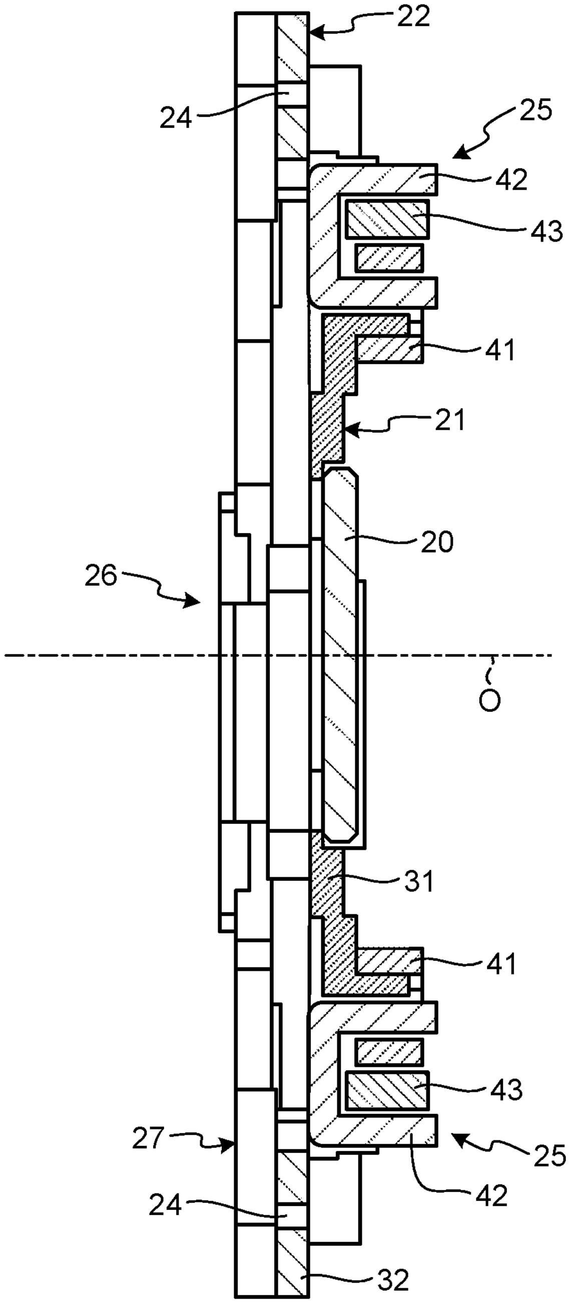
FIG. 5 is a V-V sectional view of FIG. 3.

FIG. 3 is a plan view illustrating the optical path control mechanism, FIG. 4 is a IV-IV sectional view of FIG. 3, and FIG. 5 is a V-V sectional view of FIG. 3.

As illustrated in FIGS. 3 to 5, the optical path control mechanism 12 includes a swing unit 12A including an optical member (an optical unit) 20 on which the light L is made incident and an actuator 12B that swings the swing unit 12A.

The actuator 12B swings the swing unit 12A centering on a first swing axis AX and a second swing axis BX along two directions intersecting (preferably orthogonal to) a direction in which the light L is made incident on the optical member 20. The first swing axis AX and the second swing axis BX are preferably orthogonal to each other. Therefore, the optical path control mechanism 12 includes a first swing unit 21 and a second swing unit 22 functioning as the swing unit 12A, a first shaft unit 23 and a second shaft unit 24 extending along the first swing axis AX and the second swing axis BX, a first actuator 25 and a second actuator 26 functioning as the actuator 12B, and a supporting unit 27.

In FIG. 3, an AY direction is a horizontal array direction of pixels of the optical member 20 and a BY direction is a vertical array direction of the pixels of the optical member 20. The AY direction and the BY direction intersect be orthogonal to each other. The first swing axis AX direction and the second swing axis BX direction have the same center O as the AY direction and the BY direction and intersect at an angle of 45 degrees. The first swing axis AX direction is shifted by 45 degrees in the counterclockwise direction with respect to the AY direction and the second swing axis BX direction is shifted by 45 degrees in the counterclockwise direction with respect to the BY direction. That is, the first swing axis AX direction and the second swing axis BX direction are arranged to be shifted by 45 degrees with respect to the horizontal array direction and the vertical array direction of the pixels.

The optical member 20 is a member that transmits the incident light L. The light L is made incident from one surface of the optical member 20. The optical member 20 transmits the incident light L and emits the light L from the other surface. The optical member 20 is a glass plate. However, a material and a shape of the optical member 20 may be optional.

The first swing unit 21 includes an optical member 20 and a first movable unit 31. The first movable unit 31 is a member that supports the optical member 20. The first movable unit 31 is fixed to the optical member 20. Specifically, the first movable unit 31 is a member formed in a frame shape of a plate material in which a through-hole 31*a* is formed in the center. The optical member 20 is fixed to the first movable unit 31 in a state in which the optical member 20 is fit in the through-hole 31*a* of the first movable unit 31. Note that the optical member 20 is fixed to the first movable unit 31 via a fixing member or an adhesive for being fixed to the first movable unit 31. However, a method of fixing the optical member 20 to the first movable unit 31 may be optional.

The second swing unit 22 is disposed on the outer side of the first swing unit 21. The second swing unit 22 includes a second movable unit 32. The second movable unit 32 is a member that supports the first movable unit 31. The first movable unit 31 is supported to be swingable centering on the first swing axis AX with respect to the second movable unit 32. Specifically, the second movable unit 32 is a member formed in a frame shape of a plate material in which a through-hole 32*a* is formed in the center. The first movable unit 31 is swingably supported by the second movable unit 32 in a state in which the first movable unit 31 is disposed in the through-hole 32*a* of the second movable unit 32 with a predetermined gap. The first movable unit 31 and the second movable unit 32 are coupled by a pair of first shaft units 23 extending along the first swing axis AX. The first movable unit 31 swings centering on the first swing axis AX by the pair of first shaft units 23 being elastically deformed to be twisted with respect to the second movable unit 32.

The supporting unit 27 is disposed on the outer side of the second swing unit 22. The supporting unit 27 is a member that supports the second movable unit 32. The second movable unit 32 is supported to be swingable centering on the second swing axis BX with respect to the supporting unit 27. Specifically, the supporting unit 27 is a member formed in a frame shape of a plate material in which a through-hole 27*a* is formed in the center. The second movable unit 32 is swingably supported by the supporting unit 27 in a state in which the second movable unit 32 is disposed in the through-hole 27*a* of the supporting unit 27 with a predetermined gap. The second movable unit 32 and the supporting unit 27 are coupled by a pair of second shaft units 24 extending along the second swing axis BX. The second movable unit 32 swings centering on the second swing axis BX by the pair of second shaft units 24 being elastically deformed to be twisted with respect to the supporting unit 27.

The second movable unit 32 (the second swing unit 22) swings centering on the second swing axis BX with the pair of second shaft units 24 as fulcrums with respect to the supporting unit 27. The first movable unit 31 (the first swing unit 21) swings centering on the first swing axis AX with the pair of first shaft units 23 as fulcrums with respect to the second movable unit 32. Therefore, the optical member 20 fixed to the first movable unit 31 can swing centering on the first swing axis AX and the second swing axis BX. When the optical member 20 swings centering on the first swing axis AX and the second swing axis BX, the optical path of the light L transmitted through the optical member 20 can be shifted according to a change in the posture of the optical member 20.

In the present embodiment, the first movable unit 31, the second movable unit 32, the first shaft unit 23, and the second shaft unit 24 are integrally formed. Therefore, the first movable unit 31 swings with respect to the second movable unit 32 by the first shaft unit 23 being elastically deformed to be twisted in the circumferential direction. However, the first movable unit 31, the second movable unit 32, and the first shaft unit 23 may be formed separately and coupled. One end portion and the other end portion in the axial direction of the second swing axis BX in the second movable unit 32 are fixed to be coupled to the supporting unit 27. The second shaft units 24 are respectively formed at the end portions of the second movable unit 32. However, the second shaft units 24 may be respectively provided at the end portions of the second movable unit 32. The second shaft unit 24 may be fixed to be directly coupled to the supporting unit 27. Further, the second movable unit 32, the second shaft unit 24, and the supporting unit 27 may be integrally formed.

The first actuator 25 swings the first movable unit 31 (the first swing unit 21) centering on the first swing axis AX with the pair of first shaft units 23 as fulcrums with respect to the supporting unit 27. The first actuator 25 is disposed on both of one side and the other side further in the radial direction (the axial direction of the second swing axis BX) with respect to the first swing axis AX. The first actuator 25 includes coils 41, yokes 42, and magnets 43.

The coils 41 are attached to the first movable unit 31 and are fixed to a coil attachment unit 31*b* provided in the first movable unit 31. The coils 41 are respectively provided at both end portions (one side and the other side in the axial direction of the second swing axis BX) of the first movable unit 31 in the radial direction of the first swing axis AX. The yokes 42 are members that form magnetic paths. The yokes 42 are attached to the supporting unit 27 and fixed to the supporting unit 27*b*. The yokes 42 are disposed at both the end portions of the first movable unit 31 to correspond to the coils 41. The magnets 43 are permanent magnets. The magnets 43 are attached to the yokes 42 and fixed to the yokes 42. The magnets 43 are disposed in positions adjacent to the respective coils 41.

A drive signal from the drive circuit 16 (see FIG. 2) is input to the coils 41. In an example illustrated in FIG. 5, the magnets 43 are bonded to one side of the yokes 42 formed in a U shape. Air gaps are formed between surfaces of the magnets 43 not bonded and opposing surfaces of the yokes 42 formed in the U shape. The coils 41 are disposed in the air gaps. When a drive signal is input to the coils 41, an electric current flows to the coils 41, which are conductors, present in the air gaps (magnetic fields) formed by magnets 43 and yokes 42 and a force is generated in the coils 41. This force swings the first movable unit 31 (the first swing unit 21) fixed to coils 41. That is, the first actuator 25 can be considered an electromagnetic actuator configured by the coils 41, the yokes 42, and the magnets 43.

The second actuator 26 swings the second movable unit 32 (the second swing unit 22) centering on the second swing axis BX with the pair of second shaft units 24 as fulcrums with respect to the supporting unit 27. The second actuator 26 is disposed on both one side and the other side further in the radial direction (the axial direction of the first swing axis AX) with respect to the second swing axis BX. The second actuator 26 includes coils 44, yokes 45, and magnets 46.

The coils 44 are attached to the second movable unit 32 and are fixed to a coil attachment unit 32*b* provided in the second movable unit 32. The coils 44 are provided at both end portions (one side and the other side in the axial direction in the first swing axis AX) in the radial direction of the second swing axis BX of the second movable unit 32. The yokes 45 are members that form magnetic paths. The yokes 45 are attached to the supporting unit 27 and fixed to the supporting unit 27*c*. The yokes 45 are respectively disposed at both the end portions of the second movable unit 32 to correspond to the coils 44. The magnets 46 are permanent magnets. The magnets 46 are attached to the yokes 45 and fixed to the yokes 45. The magnets 46 are disposed in positions adjacent to the respective coils 44.

A drive signal from the drive circuit 16 (see FIG. 2) is input to the coils 44. In an example illustrated in FIG. 4, the magnets 46 are bonded to one sides of the yokes 45 formed in a U shape. Air gaps are formed between surfaces of the magnets 46 not bonded and opposing surfaces of the yokes 45 formed in the U shape. The coils 44 are disposed in the air gaps. When the drive signal is input to the coils 44, an electric current flows to the coils 44, which are conductors, present in the air gaps (magnetic fields) formed by magnets 46 and yokes 45 to generate a force in the coils 44. This force swings the second movable unit 32 (the second swing unit 22) fixed to the coils 44. That is, the second actuator 26 can be considered an electromagnetic actuator configured by the coils 44, the yokes 45, and the magnets 46.

In the optical path control mechanism 12, since the first movable unit 31 provided with the optical member 20 swings and the second movable unit 32 supporting the first movable unit 31 swings, it can be said that the optical member 20, the first movable unit 31, the second movable unit 32, and the coils 41 and 44 configure the swing unit 12A. That is, it can be said that a portion of the optical path control mechanism 12 that swings with respect to the supporting unit 27 indicates the swing unit 12A. Note that the first shaft unit 23 is also included in the swing unit 12A because the first shaft unit 23 swings together with the second movable unit 32. When a fixing member or an adhesive for fixing the optical member 20 to the first movable unit 31, a substrate or a lead wire for feeding an electric current to the coils 41 and 44, and the like are provided, since these also swing with respect to the supporting unit 27, these are included in the swing unit 12A.

In the present embodiment, the first movable unit 31 is swung by the first actuator 25 and the second movable unit 32 is swung by the second actuator 26. In this case, the yokes 42 and 45 configuring the actuators 25 and 26 are fixed to the supporting unit 27. Therefore, a gap is secured between the first actuator 25 and the second movable unit 32 not to interfere with each other when the second movable unit 32 is swung by the second actuator 26.

Note that the actuators 25 and 26 are of a so-called moving coil type in which the coils 41 and 44 are disposed in the movable units 31 and 32. However, not only this, but, for example, the actuators 25 and 26 may be of a so-called moving magnet type in which the magnets 43 and 46 are disposed in the movable units 31 and 32 and the coils 41 and 44 are disposed in the supporting unit 27. In this case, since the magnets 43 and 46 are swung together with the optical member 20, the magnets 43 and 46 are included in the swing unit 12A instead of the coils 41 and 44.

The optical path control mechanism 12 has the configuration explained above. However, not only this, but, the optical path control mechanism 12 may have any configuration in which the optical path of the light L by an optical unit can be shifted by the optical unit being swung by an actuator to which a drive signal is applied.

Drive Signal

Figure 6:
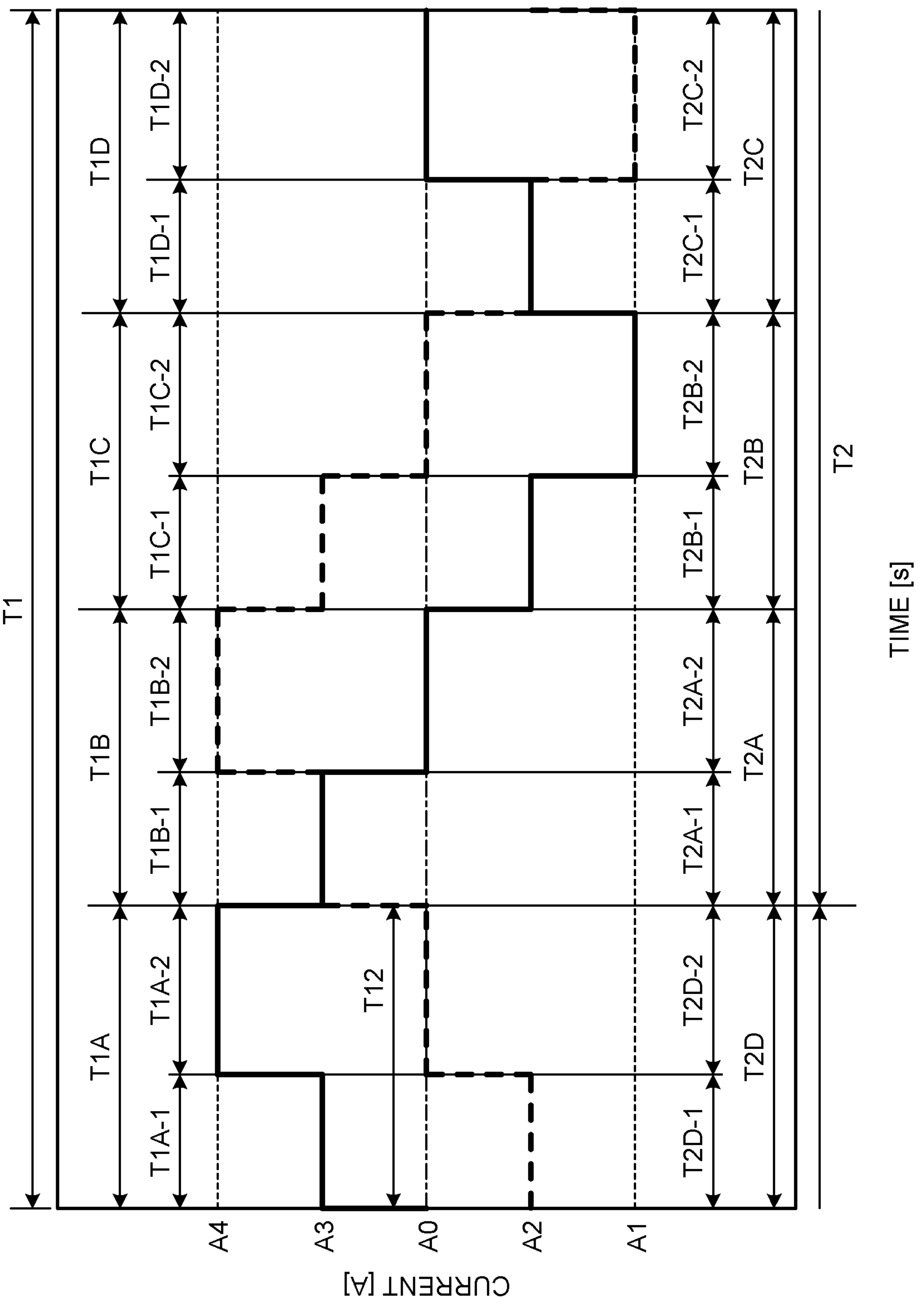
FIG. 6 is a graph for explaining a waveform of a drive signal of a drive unit.

Here, a drive signal applied from the drive circuit 16 to the actuator 12B is explained. FIG. 6 is a graph for explaining a waveform of a drive signal of the drive unit. T1 is one frame period of an input video signal. The resolution of an image to be projected can be set higher than the resolution of a light modulation device by displaying one frame in four subframes. For example, if one frame period is 60 Hz, a first subframe period is 1/240 seconds. Respective second, third, and fourth subframes are the same. In FIG. 6, a waveform of a drive signal applied to the first actuator 25 is represented by a solid line and a waveform of a drive signal applied to the second actuator 26 is represented by a dotted line.

As illustrated in FIG. 6, a digital drive signal applied from the drive circuit 16 to the first actuator 25 is an electric signal and a current value of the digital drive signal changes with the elapse of time. In the following explanation, a waveform representing a change in the current value of the drive signal for each time is referred to as waveform of the drive signal. Here, the current value changes between a first current value A1 and a fourth current value A4. However, a current value A0 in an intermediate position between the first current value A1 and the fourth current value A4 is 0. The first current value A1 and the fourth current value A4 are current values opposite in positive and negative and the absolute values of the first current value A1 and the fourth current value A4 may be equal. FIG. 6 illustrates that the first current value A1 and a second current value A2 are negative and a third current value A3 and the fourth current value A4 are positive. In the present embodiment, since the digital circuit 14A and the like include a digital switching circuit, supply of an electric current to the first actuator 25 and the second actuator 26 can be stopped. A period in which the supply of the electric current is stopped is a period in which the current value is retained at a current value A0.

A waveform of a drive signal applied to the first actuator 25 is indicated by a solid line in FIG. 6. The same waveform of the drive signal is repeated in every cycle T1. The cycle T1 includes a period T1A, a period T1B, a period T1C, and a period T1D. The period T1A, the period T1B, the period T1C, and the period T1D continue as time elapses. The period T1A corresponds to a period in which the first swing unit 21 is displaced from a reference angle D0 to a second angle D2 and a period in which the first swing unit 21 is retained at the second angle D2. Concerning the optical axis of the light L, the period T1A corresponds to a period in which the first swing unit 21 is displaced from a D operation position to an A operation position and a period in which an image (an image shifted by a ¼ pixel in one direction of the second swing axis BX directions) at the time when the first swing unit 21 is in the A operation position is displayed. The period T1C corresponds to a period in which the first swing unit 21 is displaced from the reference angle D0 to the first angle D1 and a period in which the first swing unit 21 is retained at the first angle D1. Concerning the optical axis of the light L, the period T1C corresponds to a period in which the first swing unit 21 is displaced from a B operation position to a C operation position and a period in which an image (an image shifted by a ¼ pixel in the other direction of the second swing axis BX directions) at the time when the first swing unit 21 is in the C operation position is displayed. The period T1B corresponds to a period in which the first swing unit 21 is displaced from the second angle D2 to the reference angle D0 and a period in which the first swing unit 21 is retained at the reference angle D0. The period T1D corresponds to a period in which the first swing unit 21 is displaced from the first angle D1 to the reference angle D0 and a period in which the first swing unit 21 is retained at the reference angle D0.

The period T1A includes a first period T1A-1 and a second period T1A-2. First, at start timing of the first period T1A-1, the current value of the drive signal is switched from the current value A0 to the third current value A3 and is retained at the third current value A3 until end timing of the first period T1A-1. Consequently, a displacement angle of the first swing unit 21 changes from the reference angle D0 to the second angle D2 in the first period T1A-1. Subsequently, at start timing of the second period T1A-2, the current value of the drive signal is switched from the third current value A3 to the fourth current value A4 and is retained at the fourth current value A4 until end timing of the second period T1A-2. Consequently, the displacement angle of the first swing unit 21 is retained at the second angle D2 in the second period T1A-2. The length of the first period T1A-1 is a value corresponding to the natural frequency of the first swing unit 21.

The period T1B includes a first period T1B-1 and a second period T1B-2. First, at start timing of the first period T1B-1, the current value of the drive signal is switched from the fourth current value A4 to the third current value A3 and is retained at the third current value A3 until end timing of the first period T1B-1. Consequently, the displacement angle of the first swing unit 21 is changed from the second angle D2 to the reference angle D0 and returned to the reference angle D0 in the first period T1B-1. Subsequently, at start timing of the second period T1B-2, the current value of the drive signal is switched from the third current value A3 to the current value A0 and is retained at the current value A0 until end timing of the second period T1B-2. Consequently, the displacement angle of the first swing unit 21 is retained at the reference angle DO in the second period T1B-2. The length of the first period T1B-1 is a value corresponding to the natural frequency of the first swing unit 21.

The first swing unit 21 indicates, in the optical path control mechanism 12, portions (in the present embodiment, the optical member 20, the first movable unit 31, and the coils 41) that swing with respect to the second swing unit 22. That is, it can be said that the length of the first period T1A-1 and the length of the first period T1B-1 are values corresponding to the natural frequency of the portions that swing with respect to the second swing unit 22. More specifically, the length of the first period T1A-1 and the length of the first period T1B-1 are respectively preferably substantially the same value as ½ of the natural period, which is the inverse of the natural frequency of the first swing unit 21, and more preferably the same value as ½ of the natural period.

The period T1C includes a first period T1C-1 and a second period T1C-2. First, at start timing of the first period T1C-1, the current value of the drive signal is switched from the current value A0 to the second current value A2 and is retained at the second current value A2 until end timing of the first period T1C-1. Consequently, the displacement angle of the first swing unit 21 changes from the reference angle D0 to the first angle D1 in the first period T1C-1. Subsequently, at start timing of the second period T1C-2, the current value of the drive signal is switched from the second current value A2 to the first current value A1 and is retained at the first current value A1 until end timing of the second period T1C-2. Consequently, the displacement angle of the first swing unit 21 is retained at the first angle D1 in the second period T1C-2. The length of the first period T1C-1 is a value corresponding to the natural frequency of the first swing unit 21.

The period T1D includes a first period T1D-1 and a second period T1D-2. First, at start timing of the first period T1D-1, the current value of the drive signal is switched from the first current value A1 to the second current value A2 and is retained at the second current value A2 until end timing of the first period T1D-1. Consequently, the displacement angle of the first swing unit 21 is changed from the first angle D1 to the reference angle D0 and returned to the reference angle D0 in the first period T1D-1. Subsequently, at start timing of the second period T1D-2, the current value of the drive signal is switched from the second current value A2 to the current value A0 and is retained at the current value A0 until end timing of the second period T1D-2. Consequently, the displacement angle of the first swing unit 21 is retained at the reference angle DO in the second period T1D-2. The length of the first period T1D-1 is a value corresponding to the natural frequency of the first swing unit 21.

The first swing unit 21 indicates, in the optical path control mechanism 12, portions (in the present embodiment, the optical member 20, the first movable unit 31, and the coils 41) that swing with respect to the second swing unit 22. That is, it can be said that the length of the first period T1C-1 and the length of the first period T1D-1 are values corresponding to the natural frequency of the portions that swing with respect to the second swing unit 22. More specifically, the length of the first period T1C-1 and the length of the first period T1D-1 are preferably substantially the same value as ½ of the natural period, which is the inverse of the natural frequency of the first swing unit 21, respectively, and more preferably the same value as ½ of the natural period.

On the other hand, a waveform of the drive signal applied to the second actuator 26 is indicated by a dotted line in FIG. 6. The same waveform of the drive signal is repeated in every cycle T2. The cycle T2 includes a period T2A, a period T2B, a period T2C, and a period T2D. The period T2A, the period T2B, the period T2C, and the period T2D continue as time elapses. The period T2A corresponds to a period in which the second swing unit 22 is displaced from the reference angle D0 to the second angle D2 and a period in which the second swing unit 22 is retained at the second angle D2. Concerning the optical axis of the light L, the period T2A corresponds to a period in which the second swing unit 22 is displaced from the A operation position to the B operation position and a period in which an image at the time when the second swing unit 22 is in the B operation position (an image shifted by a ¼ pixel in one direction of the first swing axis AX directions) is displayed. The period T1D corresponds to a period in which the second swing unit 22 is displaced from the reference angle D0 to the first angle D1 and a period in which the second swing unit 22 is retained at the first angle D1. Concerning the optical axis of the light L, the period T1D corresponds to a period in which the second swing unit 22 is displaced from the C operation position to the D operation position and a period in which an image at the time when the second swing unit 22 is in the D operation position (an image shifted by a ¼ pixel in the other direction of the first swing axis AX directions) is displayed. The period T2B corresponds to a period in which the second swing unit 22 is displaced from the second angle D2 to the reference angle D0 and a period in which the second swing unit 22 is retained at the reference angle D0. The period T2D corresponds to a period in which the second swing unit 22 is displaced from the first angle D1 to the reference angle D0 and a period in which the second swing unit 22 is retained at the reference angle D0.

The period T2A includes a first period T2A-1 and a second period T2A-2. First, at start timing of the first period T2A-1, the current value of the drive signal is switched from the current value A0 to the third current value A3 and is retained at the third current value A3 until end timing of the first period T2A-1. Consequently, a displacement angle of the second swing unit 22 changes from the reference angle D0 to the second angle D2 in the first period T2A-1. Next, at start timing of the second period T2A-2, the current value of the drive signal is switched from the third current value A3 to the fourth current value A4 and is retained at the fourth current value A4 until end timing of the second period T2A-2. Consequently, the displacement angle of the second swing unit 22 is retained at the second angle D2 in the second period T2A-2. The length of the first period T2A-1 is a value corresponding to the natural frequency of the second swing unit 22.

The period T2B includes a first period T2B-1 and a second period T2B-2. First, at start timing of the first period T2B-1, the current value of the drive signal is switched from the fourth current value A4 to the third current value A3 and is retained at the third current value A3 until end timing of the first period T1B-1. Consequently, the displacement angle of the second swing unit 22 is changed from the second angle D2 to the reference angle D0 and is returned to the reference angle D0 in the first period T2B-1. Subsequently, at start timing of the second period T2B-2, the current value of the drive signal is switched from the third current value A3 to the current value A0 and is retained at the current value A0 until end timing of the second period T2B-2. Consequently, the second swing unit 22 is retained at the reference angle D0 in the second period T2B-2. The length of the first period T2B-1 is a value corresponding to the natural frequency of the second swing unit 22.

The second swing unit 22 indicates, in the optical path control mechanism 12, portions (in the present embodiment, the optical member 20, the second movable unit 32, and the coils 44) that swing with respect to the supporting unit 27. That is, it can be said that the length of the first period T2A-1 and the length of the first period T2B-1 are values corresponding to the natural frequency of the portions that swing with respect to the supporting unit 27. More specifically, the length of the first period T2A-1 and the length of the first period T2B-1 are preferably substantially the same value as ½ of the natural period, which is the inverse of the natural frequency of the second swing unit 22, respectively, and more preferably the same value as ½ of the natural period.

The period T2C includes a first period T2C-1 and a second period T2C-2. First, at start timing of the first period T2C-1, the current value of the drive signal is switched from the current value A0 to the second current value A2 and is retained at the second current value A2 until end timing of the first period T2C-1. Consequently, the displacement angle of the second swing unit 22 changes from the reference angle D0 to the first angle D1 in the first period T2C-1. Subsequently, at start timing of the second period T2C-2, the current value of the drive signal is switched from the second current value A2 to the first current value A1 and is retained at the first current value A1 until end timing of the second period T2C-2. Consequently, the displacement angle of the second swing unit 22 is retained at the first angle D1 in the second period T2C-2. The length of the first period T2C-1 is a value corresponding to the natural frequency of the second swing unit 22.

The period T2D includes a first period T2D-1 and a second period T2D-2. First, at start timing of the first period T2D-1, the current value of the drive signal is switched from the first current value A1 to the second current value A2 and is retained at the second current value A2 until end timing of the first period T2D-1. Consequently, the displacement angle of the second swing unit 22 is changed from the first angle D1 to the reference angle D0 and returned to the reference angle D0 in the first period T2D-1. Subsequently, at start timing of the second period T2D-2, the current value of the drive signal is switched from the second current value A2 to the current value A0 and is retained at the current value A0 until end timing of the second period T2D-2. Consequently, the second swing unit 22 is retained at the reference angle D0 in the second period T2D-2. The length of the first period T2D-1 is a value corresponding to the natural frequency of the second swing unit 22.

The second swing unit 22 indicates, in the optical path control mechanism 12, portions (in the present embodiment, the optical member 20, the second movable unit 32, and the coils 44) that swing with respect to the supporting unit 27. That is, it can be said that the length of the first period T2C-1 and the length of the first period T2D-1 are values corresponding to the natural frequency of the portions that swing with respect to the supporting unit 27. More specifically, the length of the first period T2C-1 and the length of the first period T2D-1 are preferably substantially the same value as ½ of the natural period, which is the inverse of the natural frequency of the second swing unit 22, respectively, and more preferably the same value as ½ of the natural period.

The waveform of the drive signal applied to the first actuator 25 (the solid line in FIG. 6) and the waveform of the drive signal applied to the second actuator 26 (the dotted line in FIG. 6) shift by a predetermined period T12. For example, the start timing of the first period T1A-1 of the waveform of the drive signal applied to the first actuator 25 and the start timing of the first period T2A-1 of the waveform of the drive signal applied to the second actuator 26 shift by a predetermined period T12. Therefore, the second period T1A-2 in which the current value in the waveform of the drive signal applied to the first actuator 25 is retained at the fourth current value A4 is the second period T2D-2 in which the current value in the waveform of the drive signal applied to the second actuator 26 is retained at the current value A0 (the current value 0). Similarly, the second period T1C-2 in which the current value in the waveform of the drive signal applied to the first actuator 25 is retained at the first current value A1 is the second period T2D-2 in which the current value in the waveform of the drive signal applied to the second actuator 26 is retained at the current value A0 (the current value 0).

The second period T2A-2 in which the current value in the waveform of the drive signal applied to the second actuator 26 is retained at the fourth current value A4 is the second period T2B-2 in which the current value in the waveform of the drive signal applied to the first actuator 25 is retained at the current value A0 (the current value 0). Similarly, the second period T2C-2 in which the current value in the waveform of the drive signal applied to the second actuator 26 is retained at the first current value A1 is the second period T2D-2 period T1D in which the current value in the waveform of the drive signal applied to the first actuator 25 is retained at the current value A0 (the current value 0).

Swing Pattern

Figure 7:
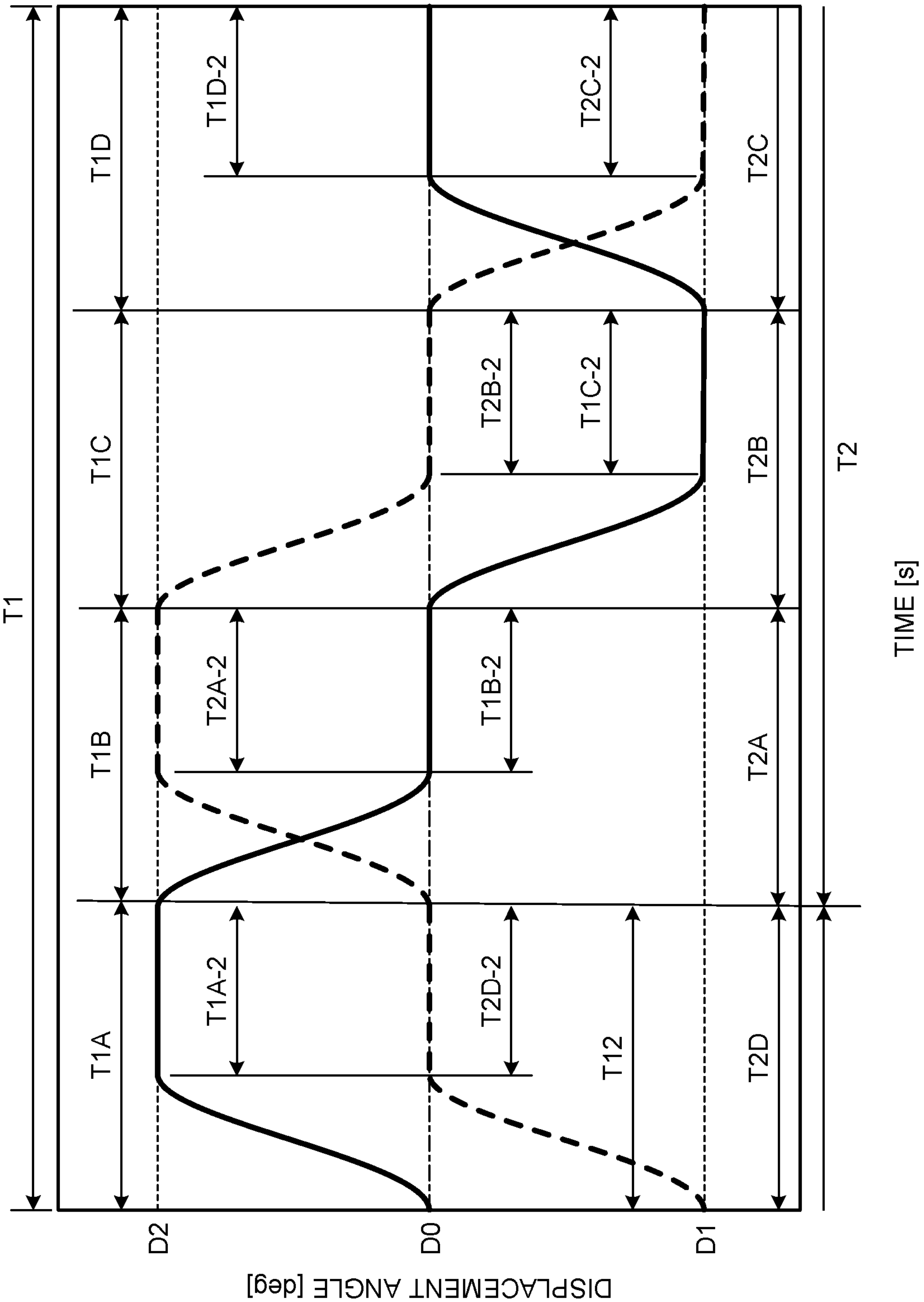
FIG. 7 is a graph for explaining a swing pattern of an optical unit.

Next, swing patterns of the first swing unit 21 and the second swing unit 22 by application of a drive signal is explained. FIG. 7 is a graph for explaining a swing pattern of the optical unit. In FIG. 7, the swing pattern of the first swing unit 21 is represented by a solid line and the swing pattern of the second swing unit 22 is represented by a dotted line.

As illustrated in FIG. 7, the swing pattern (the solid line) of the first swing unit 21 indicates a displacement angle (an angle around the first swing axis AX) of the first swing unit 21 in each time when a drive signal is applied to the first actuator 25. The swing pattern (the dotted line) of the second swing unit 22 indicates a displacement angle (an angle around the second swing axis BX) of the second swing unit 22 in each time when a drive signal is applied to the second actuator 26.

Figure 9:
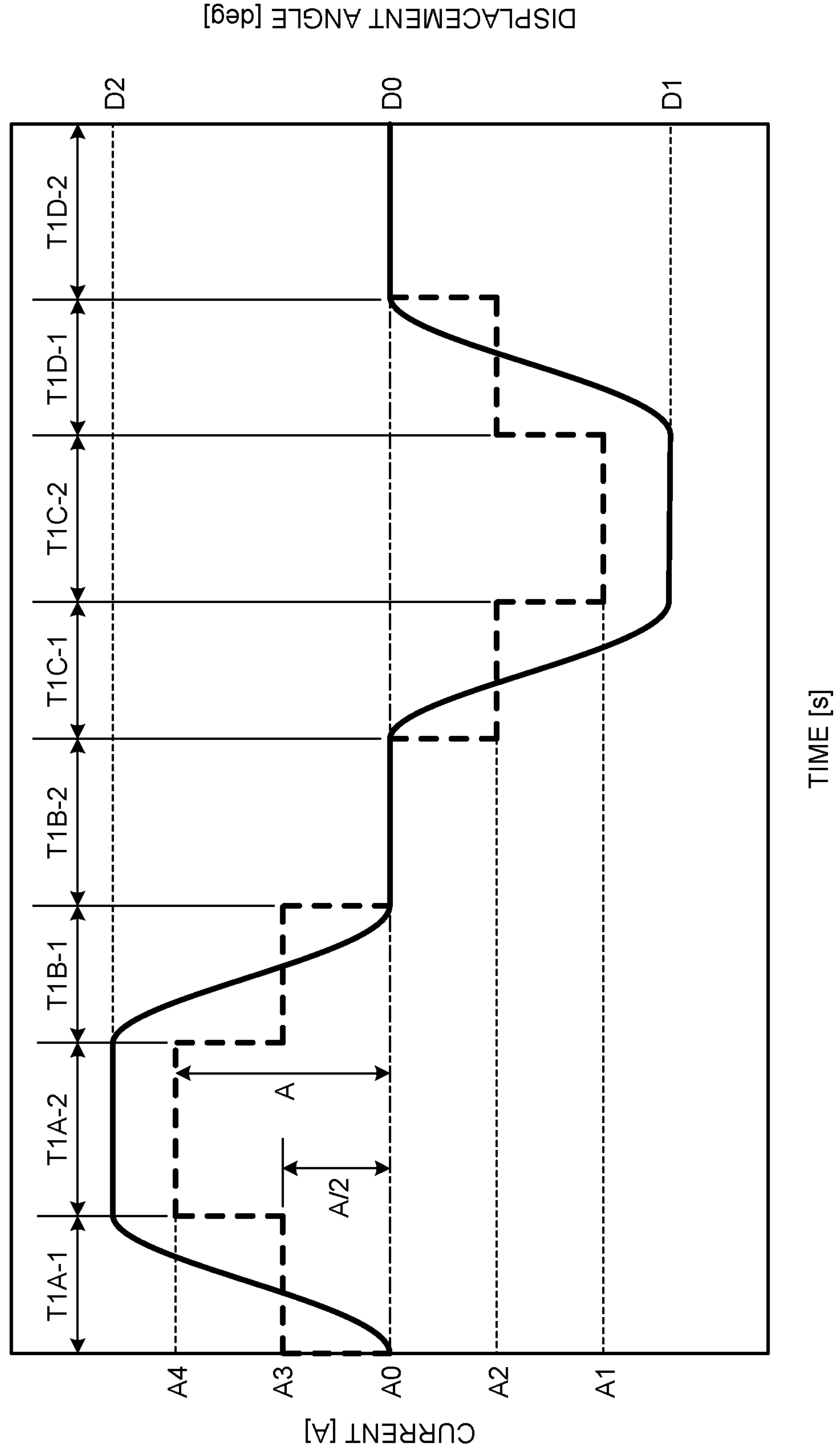
FIG. 9 is a graph for explaining a relation between a waveform of the drive signal of the drive unit and a swing pattern of the optical unit.

As illustrated in FIG. 9, in the first swing unit 21, in the first period T1A-1, the current value of the drive signal is switched from the current value A0 to the third current value A3 and is retained at the third current value A3 until the end timing of the first period T1A-1. Consequently, a displacement angle of the first swing unit 21 changes from the reference angle D0 to the second angle D2 in the first period T1A-1.

In the second period T1A-2, the current value of the drive signal is retained at the fourth current value A4. Consequently, the displacement angle of the first swing unit 21 is retained at the second angle D2 in the second period T1A-2. Note that, in the following explanation, the current value and the displacement angle being retained is not limited to the current value and the displacement angle not strictly changing and may include the current value and the displacement angle deviating in a range of a predetermined value. The predetermined value here may be optionally set but may be, for example, a value of 10% of the current value or the displacement angle.

In the first period T1B-1, the current value of the drive signal is switched from the fourth current value A4 to the third current value A3 and is retained at the third current value A3 until the end timing of the first period T1B-1. Consequently, the displacement angle of the first swing unit 21 changes from the second angle D2 to the reference angle D0 in the first period T1B-1. In the second period T1B-2, the current value of the drive signal is switched to the current value A0 and is retained at the current value A0 until the end timing of the second period T1B-2. Consequently, the displacement angle of the first swing unit 21 is retained at the reference angle D0 in the second period T1B-2.

In the first period T1C-1, the current value of the drive signal is switched from the current value A0 to the second current value A2 and is retained at the second current value A2 until the end timing of the first period T1C-1. Consequently, the displacement angle of the first swing unit 21 changes from the reference angle D0 to the first angle D1 in the first period T1C-1. In the second period T1C-2, the current value of the drive signal is retained at the first current value A1. Consequently, the displacement angle of the first swing unit 21 is retained at the first angle D1 in the second period T1C-2.

In the first period T1D-1, the current value of the drive signal is switched from the first current value A1 to the second current value A2 and is retained at the second current value A2 until the end timing of the first period T1D-1. Consequently, the displacement angle of the first swing unit 21 changes from the first angle D1 to the reference angle D0 in the first period T1D-1. In the second period T1D-2, the current value of the drive signal is switched to the current value A0 and is retained at the current value A0 until the end timing of the second period T1D-2. Consequently, the displacement angle of the first swing unit 21 is retained at the reference angle D0 in the second period T1D-2.

Note that the light L is emitted in the periods T1A-2 and T1C-2. Therefore, in the period T1A-2, the first swing unit 21 retained at the second angle D2 is irradiated with the light L, the optical path of the light L shifts to the A operation position, and the image shifts by a ¼ pixel. In the period T1C-2, the first swing unit 21 retained at the first angle D1 is irradiated with the light L, the optical path of the light L is shifted to the D operation position, and the image shifts by a ¼ pixel. Therefore, the optical path of the light L shifts from the A operation position to the C operation position by a half pixel.

On the other hand, in the second swing unit 22, in the first period T2A-1, the current value of the drive signal is switched from the current value A0 to the third current value A3 and is retained at the third current value A3 until end timing of the first period T2A-1. The current value of the drive signal changes to the fourth current value A4. Consequently, a displacement angle of the second swing unit 22 changes from the reference angle D0 to the second angle D2 in the first period T2A-1.

In the second period T2A-2, the current value of the drive signal is retained at the fourth current value A4. Consequently, the displacement angle of the second swing unit 22 is retained at the second angle D2 in the second period T2A-2.

In the first period T2B-1, the current value of the drive signal is switched from the fourth current value A4 to the third current value A3 and is retained at the third current value A3 until end timing of the first period T2B-1. Consequently, the displacement angle of the second swing unit 22 changes from the second angle D2 to the reference angle D0 in the first period T2B-1. In the second period T2B-2, the current value of the drive signal is retained at the current value A0. Consequently, the displacement angle of the second swing unit 22 is retained at the reference angle D0 in the second period T2B-2.

In the first period T2C-1, the current value of the drive signal is switched from the current value A0 to the second current value A2 and is retained at the second current value A2 until end timing of the first period T2C-1. Consequently, the displacement angle of the second swing unit 22 changes from the reference angle D0 to the first angle D1 in the first period T2C-1. In the second period T2C-2, the current value of the drive signal is retained at the first current value A1. Consequently, the displacement angle of the second swing unit 22 is retained at the first angle D1 in the second period T2C-2.

In the first period T2D-1, the current value of the drive signal is switched from the first current value A1 to the second current value A2 and is retained at the second current value A2 until end timing of the first period T2D-1. Consequently, the displacement angle of the second swing unit 22 changes from the first angle D1 to the reference angle D0 in the first period T2D-1. In the second period T2D-2, the current value of the drive signal is switched to the current value A0 and is retained at the current value A0 until end timing of the second period T2D-2. Consequently, the displacement angle of the second swing unit 22 is retained at the reference angle D0 in the second period T2D-2.

Note that the light L is emitted in the periods T2A-2 and T2C-2. Therefore, in the period T2A-2, the second swing unit 22 retained at the second angle D2 is irradiated with the light L, the optical path of the light L shifts to the A operation position, and the image shifts by a ¼ pixel. In the period T2C-2, the first swing unit 21 retained at the first angle D1 is irradiated with the light L, the optical path of the light L shifts to the C operation position, and the image shifts by a ¼ pixel. Therefore, the optical path of the light L shifts from the A operation position to the C operation position by a half pixel.

As illustrated in FIG. 6, the waveform (the solid line in FIG. 6) of the drive signal applied to the first actuator 25 and the waveform (the dotted line) of the drive signal applied to the second actuator 26 shift by a predetermined period T12. Therefore, the periods T1A-2 and T1C-2 in which the first swing unit 21 swings and emits the light L and the periods T2A-2 and T2C-2 in which the second swing unit 22 swings and emits the light L shift by the predetermined period T12. At this time, the second period T1A-2 in which the current value of the first actuator 25 is retained at the fourth current value A4 overlaps a neutral period T2D-2 in which the current value of the second actuator 26 is retained at the current value AG, that is, the current value is retained at 0. Similarly, the second period T1C-2 in which the current value of the first actuator 25 is retained at the first current value A1 overlaps a neutral period T2B-2 in which the current value of the second actuator 26 is retained at the current value AG, that is, the current value is retained at 0.

The second period TA-2 in which the current value of the second actuator 26 is retained at the fourth current value A4 overlaps a neutral period T1B-2 in which the current value of the first actuator 25 is retained at the current value AG, that is, the current value is retained at 0. Similarly, the second period T2C-2 in which the current value of the second actuator 26 is retained at the first current value A1 overlaps the neutral period T1D-2 in which the current value of the first actuator 25 is retained at the current value AG, that is, the current value is retained at 0.

In FIG. 6, the natural frequency of the first swing unit 21 and the natural frequency of the second swing unit 22 are not necessarily the same. The torsional rigidity of the first swing unit 21 and the torsional rigidity of the second swing unit 22 are not necessarily the same. Therefore, the current values A1 to A4 of the first swing unit (the solid line) 21 and the current values A1 to A4 of the second swing unit (the dotted line) 22 do not need to be the same, respectively. The lengths of the period T1A-1 and the period T2A-1 and the period T1B-1 and the period T2B-1 do not need to be the same, respectively. The same applies to the period T1C and the period T2C and the period T1D and the period T2D.

Operation of Pixels by the Optical Path Control Mechanism

Figure 8:
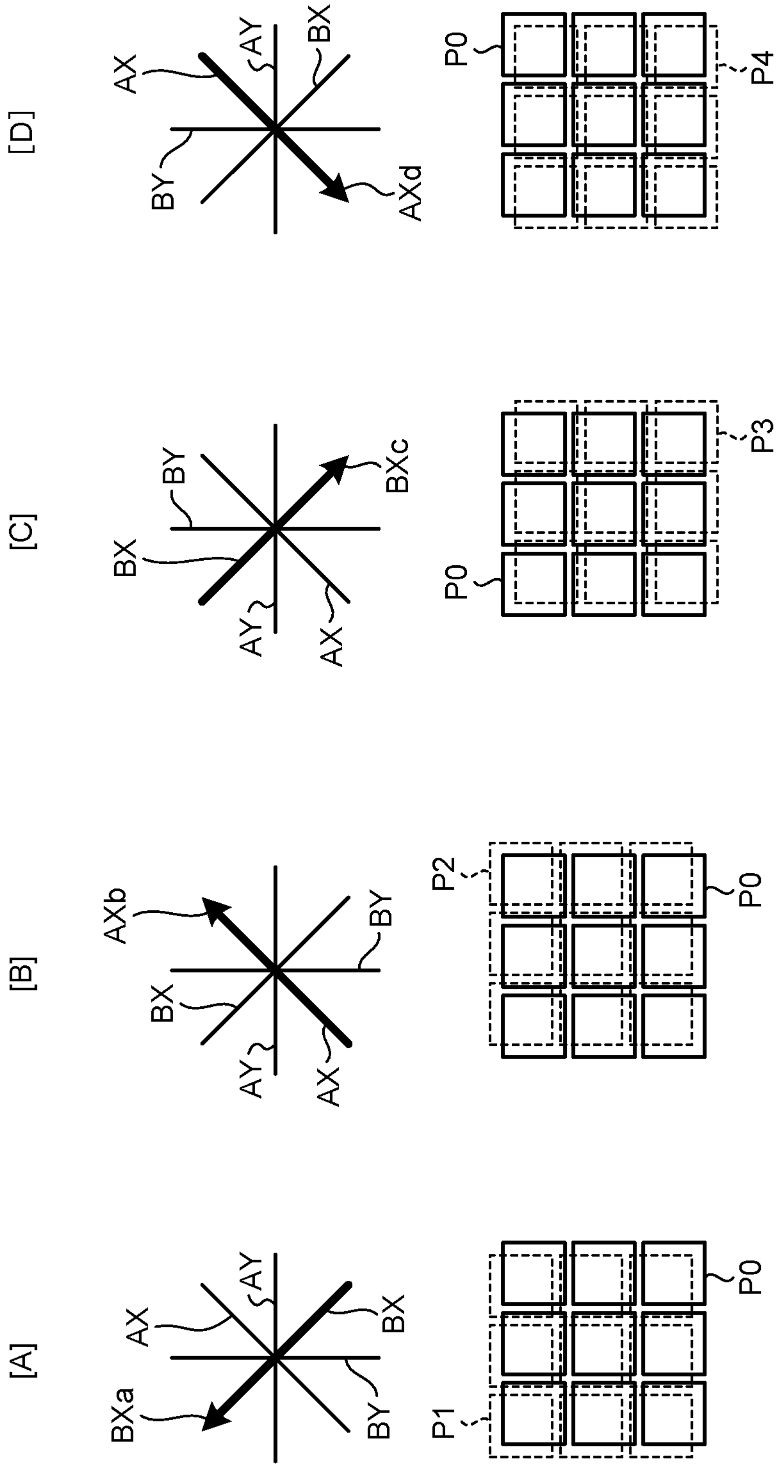
FIG. 8 is an explanatory view for explaining a biaxial swing pattern of the optical unit.

In the following explanation, operation at the time when the first swing unit 21 and the second swing unit 22 are swung is explained. FIG. 8 is an explanatory diagram for explaining a biaxial swing pattern of the optical unit.

As illustrated in FIG. 3 and FIG. 8, in the optical path control mechanism 12, when a horizontal array direction of the pixels of the optical member 20 is the AY direction and a vertical array direction of the pixels of the optical member 20 is the BY direction, the first swing axis AX direction and the second swing axis BX direction are arranged to be shifted by 45 degrees with respect to the AY direction and the BY direction. It is assumed that, when the inclination of each of the first swing unit 21 and the second swing unit 22 is the reference angle D0, the optical axis of the light L is present in the reference position.

The first actuator 25 swings the first swing unit 21 to repeat a posture change from the reference angle D0 to the second angle D2 around the first shaft unit AX and a posture change from the reference angle D0 to the first angle D1 respectively according to drive signals. When the first swing unit 21 repeats swings between the first angle D1 and the second angle D2, respectively, the optical axis of the light L repeats the shift from the reference position to the A operation position and the shift from the reference position to the C operation position. In the following explanation, the position of an image projected onto a screen by the light L when the optical axis is present in the reference position is sometimes referred to as reference position.

That is, an image projected onto the screen by the light L when the optical axis is in the A operation position and an image projected onto the screen by the light L when the optical axis is in the C operation position are shifted by a half pixel. That is, the image projected onto the screen shifts by a ¼ pixel from the reference position but shifts by a half pixel between the A operation position and the C operation position. In this way, the shift by a ¼ pixel from the reference position and the return by a ¼ pixel, and the shift by a ¼ pixel in the opposite direction and the return by a ¼ pixel are repeated. Consequently, an apparent number of pixels increases and the resolution of the image projected onto the screen can be increased. Since the shift amount of the optical axis is a half pixel of the image, the first angle D1 and the second angle D2 are set to angles at which the image can be shifted by a ¼ pixel. Note that the shift amount of the image is not limited to the half pixel and may be optional, for example, ½ or ⅛ of a pixel. The first angle D1 and the second angle D2 may also be set as appropriate according to the shift amount of the image.

The second actuator 26 swings the second swing unit 22 to repeat a posture change from the reference angle D0 to the second angle D2 around the first shaft unit BX and a posture change from the reference angle D0 to the first angle D1 respectively according to drive signals. When the second swing unit 22 repeats swings between the first angle D1 and the second angle D2, respectively, the optical axis of the light L repeats the shift from the reference position to the B operation position and the shift from the reference position to the D operation position.

That is, the image projected onto the screen by the light L when the optical axis is in the B operation position and the image projected onto the screen by the light L when the optical axis is in the D operation position are shifted by a half pixel. That is, the image projected onto the screen shifts by a ¼ pixel from the reference position but shifts by a half pixel between the B operation position and the D operation position. In this way, the shift by a ¼ pixel from the reference position and the return by a ¼ pixel and the shift by a ¼ pixel in the opposite direction and the return by a ¼ pixel are repeated. Consequently, an apparent number of pixels increases and the resolution of the image projected onto the screen can be increased. Since the shift amount of the optical axis is a half pixel of the image, the first angle D1 and the second angle D2 are set to angles at which the image can be shifted by a ¼ pixel. Note that the shift amount of the image is not limited to the half pixel and may be optional, for example, ½ or ⅛ of a pixel. The first angle D1 and the second angle D2 may also be set as appropriate according to the shift amount of the image.

In the following explanation, a specific description is made. The image position P0 is a display position at the time when the current value applied to the first actuator 25 and the second actuator 26 is 0, that is, when the displacement angle of the optical member 20 is 0. The A operation state is a state in which the optical member 20 is swung by a predetermined angle around the first swing axis AX by the first actuator 25 and the image position P0 is shifted by a ¼ pixel in the second swing axis BX direction. That is, the A operation state is a state in which an image is displayed in the image position P1.

The B operation state is a state in which the optical member 20 is swung by a predetermined angle around the second swing axis BX by the second actuator 26 and the image position P0 is shifted by a ¼ pixel in the first swing axis AX direction. That is, the B operation state is a state in which an image is displayed in the image position P2. Similarly, the C operation state is a state in which an image is displayed in the image position P3. Similarly, the D operation state is a state in which an image is displayed in the image position P4.

Drive Waveform

FIG. 9 is a graph illustrating a relation between a waveform of a drive signal of the drive unit and a swing pattern of the optical unit. In the following explanation, a waveform of a drive signal applied to the first actuator 25 and a swing pattern of the first swing unit 21 are explained. However, the same applies to the second actuator 26 and the second swing unit 22. In the following explanation, a position of the first swing unit 21 at the time when a drive signal for setting a current value applied to the first actuator 25 to 0 is applied is referred to as reference position of the first swing unit 21. A position of the second swing unit 22 at the time when a drive signal for setting a current value applied to the second actuator 26 to 0 is applied is referred to as reference position of the second swing unit 22.

As illustrated in FIG. 9, with the current value A0 applied to the first actuator 25, a current value is switched to the third current value A3 at the start timing of the first period T1A-1 with respect to the first actuator 25 from a state in which the first swing unit 21 is in the reference position (the displacement angle 0) and is retained until the end timing of the first period T1A-1. Here, the length of the first period T1A-1 is length corresponding to ½ cycle of the cycle of the natural frequency of the first swing unit 21 and the third current value A3 is a current value of ½ of the fourth current value A4, which is a peak current value. Then, the displacement angle of the first swing unit 21 changes from the reference angle D0 to the second angle D2 in the first period T1A-1. At the start timing of the second period T1A-2, the current value is switched to the fourth current value A4 and is retained until the end timing of the second period T1A-2. Then, the first swing unit 21 is maintained at the second angle D2 in the second period T1A-2.

Subsequently, the current value is switched to the third current value A3 at the start timing of the first period T1B-1 and is retained until the end timing of the first period T1B-1. Here, the length of the first period T1B-1 is length corresponding to ½ cycle of the cycle of the natural vibration of the first swing unit 21. Then, the displacement angle of the first swing unit 21 changes from the second angle D2 to the reference angle D0 in the first period T1B-1. Then, at the start timing of the second period T1B-2, the current value is switched to the current value A0 and is retained until the end timing of the second period T1B-2. Then, the first swing unit 21 is maintained at the reference angle D0 in the second period T1B-2.

By forming the waveform of the drive signal applied to the first actuator 25 in a staircase shape, the displacement angle of the first swing unit 21 can be maintained at the second angle D2 and the reference angle D0. The same applies to the periods T1C and T1D.

Power Consumption of the Actuators

Figure 10:
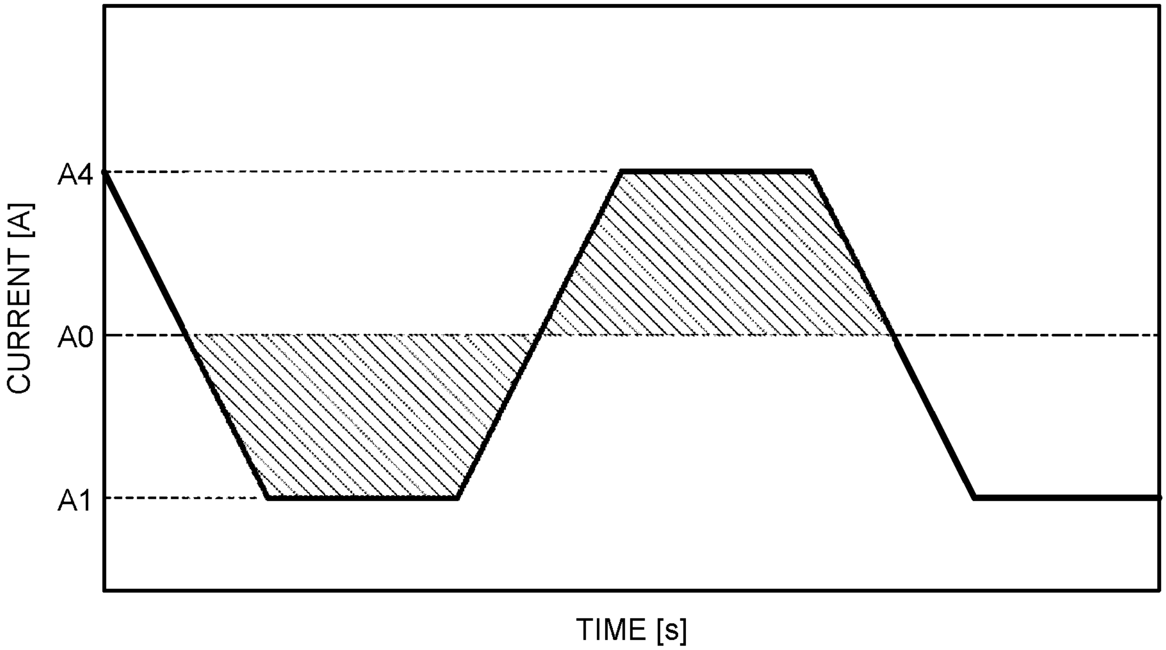
FIG. 10 is a schematic diagram for explaining power consumption in a trapezoidal wave of the drive signal.
Figure 11:
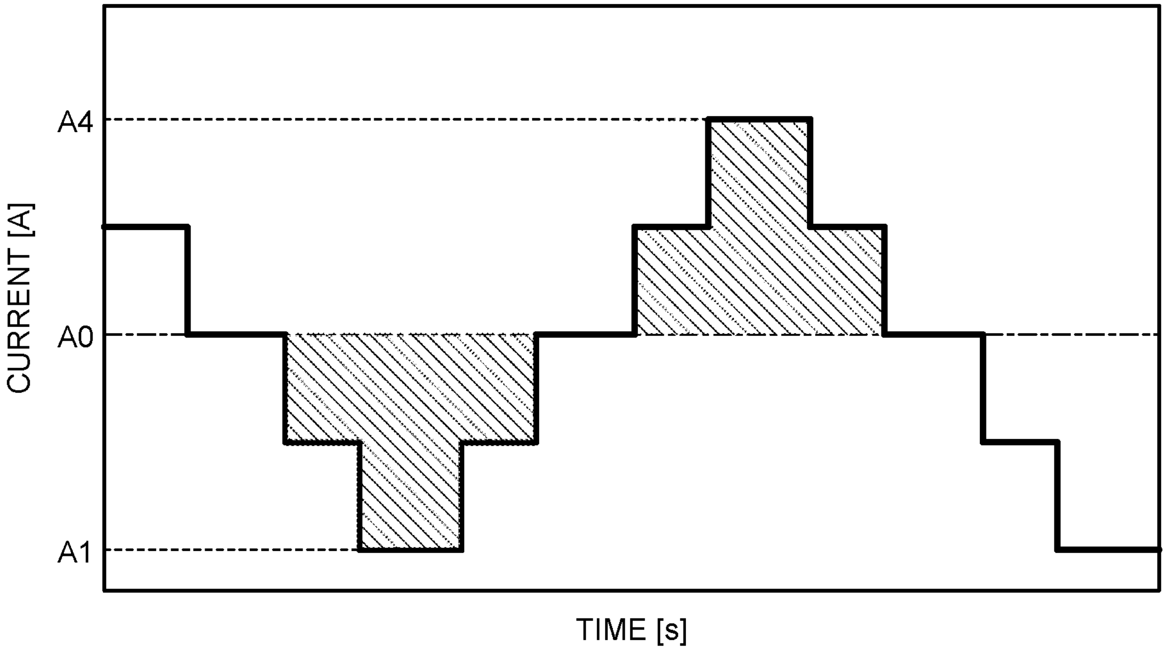
FIG. 11 is a schematic view for explaining power consumption in a staircase wave of the drive signal.

FIG. 10 is a schematic diagram illustrating power consumption in a trapezoidal wave of the drive signal. FIG. 11 is a schematic diagram illustrating power consumption in a staircase wave of the drive signal.

As illustrated in FIG. 10, when a waveform of a drive signal applied to the first actuator 25 and the second actuator 26 is a trapezoidal shape, power consumption, which is an area (a hatched portion) between the current value A0 and the trapezoidal wave, increases. On the other hand, as illustrated in FIG. 11, when the waveform of the drive signal applied to the first actuator 25 and the second actuator 26 is a staircase shape, power consumption, which is an area (a hatched portion) between the current value A0 and the staircase wave, becomes smaller than that of the trapezoidal wave.

Second Embodiment

Optical Path Control Mechanism

Figure 12:
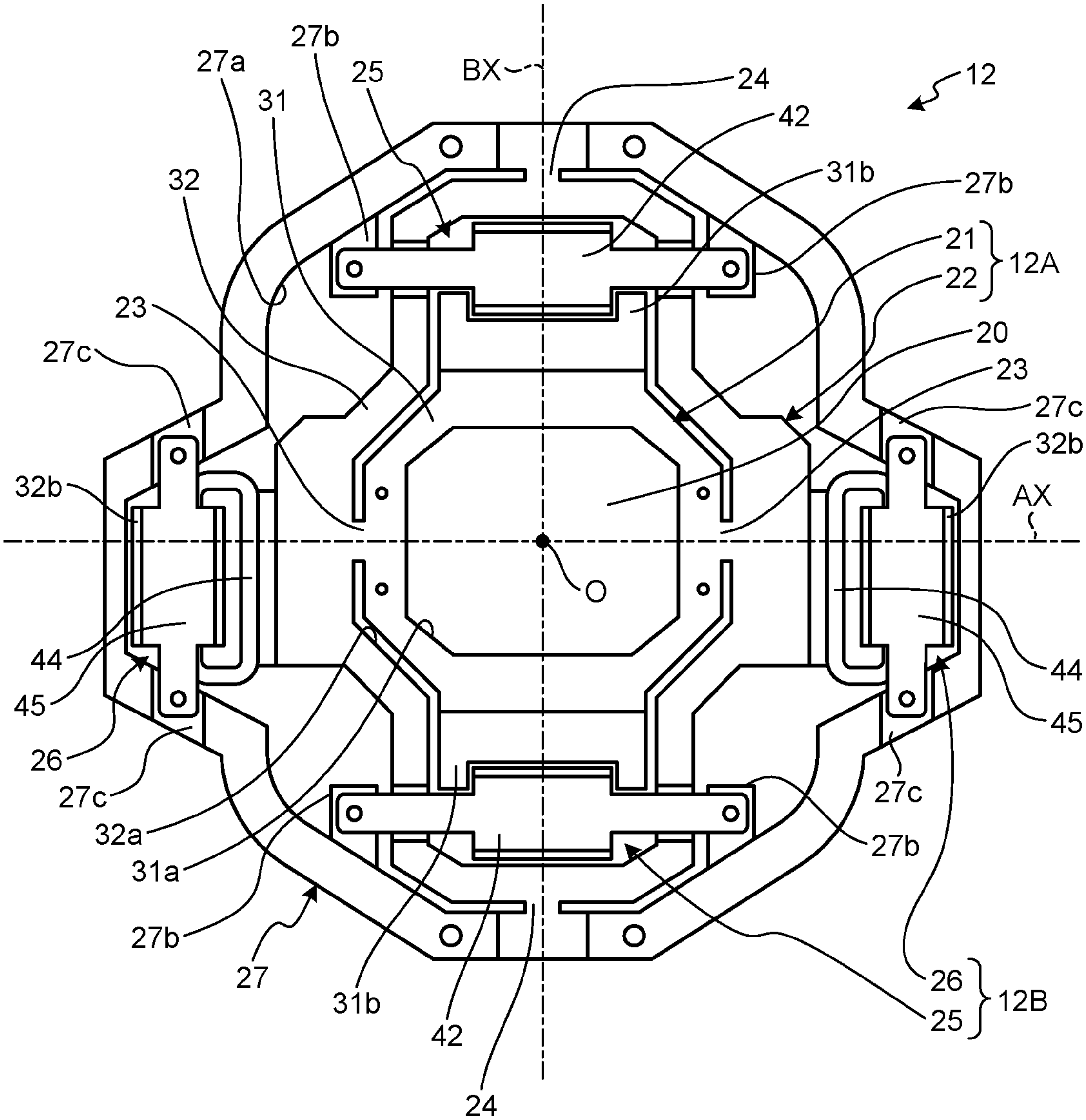
FIG. 12 is a plan view illustrating an optical path control mechanism in a display device according to a second embodiment.

FIG. 12 is a plan view illustrating an optical path control mechanism in a display device according to a second embodiment. Note that a basic configuration of the second embodiment is the same as the basic configuration of the first embodiment explained above. Members having the same functions are denoted by the same reference numerals and signs and detailed explanation of the members is omitted.

As illustrated in FIG. 12, the optical path control mechanism 12 includes a swing unit 12A including an optical member (an optical unit) 20 on which the light L is made incident and an actuator 12B that swings the swing unit 12A.

The actuator 12B swings the swing unit 12A centering on a first swing axis AX and a second swing axis BX along two directions intersecting (preferably orthogonal to) a direction in which the light L is made incident on the optical member 20. The first swing axis AX and the second swing axis BX are preferably orthogonal to each other. Therefore, the optical path control mechanism 12 includes a first swing unit 21 and a second swing unit 22 functioning as the swing unit 12A, a first shaft unit 23 and a second shaft unit 24 extending along the first swing axis AX and the second swing axis BX, a first actuator 25 and a second actuator 26 functioning as the actuator 12B, and a supporting unit 27.

In FIG. 12, an AX direction is a horizontal array direction of pixels of the optical member 20 and a BX direction is a vertical array direction of the pixels of the optical member 20. The AX direction and the BX direction intersect to be orthogonal to each other. The first swing axis AX direction and the second swing axis BX direction intersect at an angle of 90 degrees at the shared center O. The other components are the same as the components in the first embodiment.

Drive Signal

Figure 13:
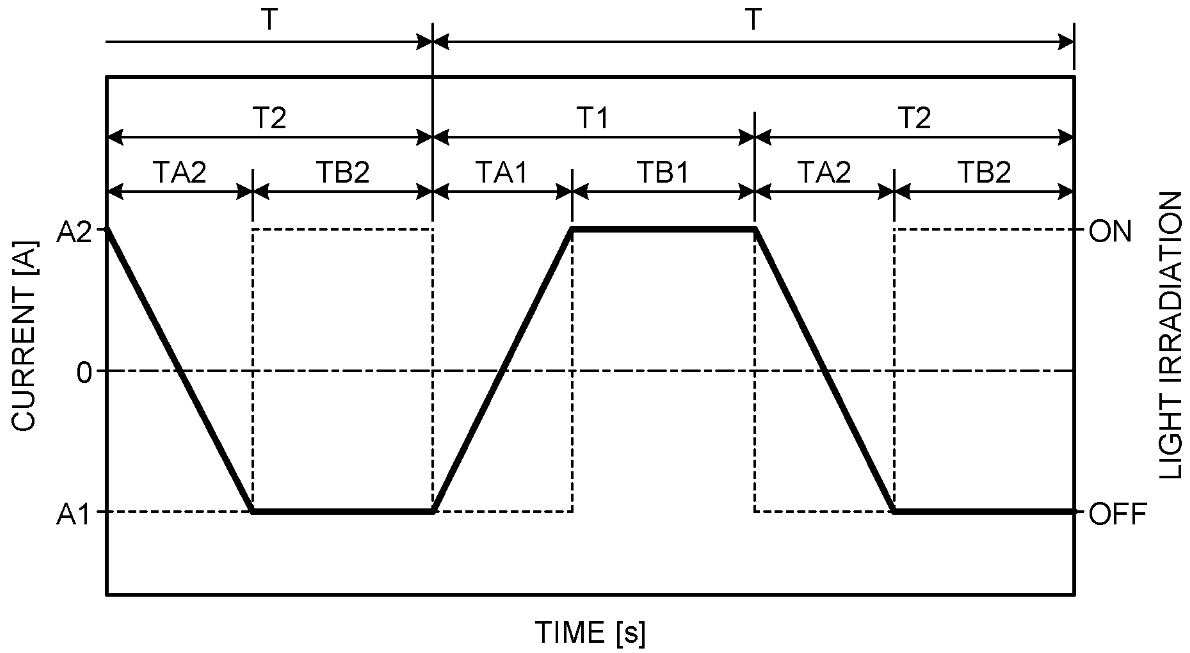
FIG. 13 is a graph for explaining a waveform of a drive signal of a drive unit.

Here, a drive signal applied from the drive circuit 16 to the actuator 12B is explained. FIG. 13 is a graph illustrating a waveform of a drive signal of the drive unit.

As illustrated in FIG. 13, a drive signal applied from the drive circuit 16 to the first actuator 25 is an electric signal and a current value changes with elapse of time. In the following explanation, a waveform representing a change in the current value of the drive signal for each time is referred to as waveform of the drive signal. The waveform of the drive signal is indicated by a solid line in FIG. 13. The same waveform of the drive signal is repeated at every cycle T. The cycle T includes a period T1 and a period T2 that is after the period T1 and is continuous to the period T1. The period T1 corresponds to a period in which an image (an image not shifted by a half pixel) at the time when the optical axis of the light L is in a first position is displayed. The period T2 corresponds to a period in which an image (an image shifted by a half pixel) at the time when the optical axis of the light L is in the second position is displayed.

The current value of the drive signal changes from the first current value A1 to the second current value A2 in the first period TA1 in the period T1. Here, an intermediate position 0 between the first current value A1 and the second current value A2 is a position where the current value is 0. In the first period TA1, the current value of the drive signal linearly changes from the first current value A1 to the second current value A2 with elapse of time. That is, the current value of the drive signal is the first current value A1 at the start timing of the first period TA1, thereafter, changes linearly from the first current value A1, and becomes the second current value A2 at the end timing of the first period TA1. The first current value A1 is a current value capable of retaining the first swing unit 21 at the first angle D1 and is set according to a numerical value of the first angle D1. The second current value A2 is a current value capable of retaining the first swing unit 21 at the second angle D2 and is set according to a numerical value of the second angle D2. The first current value A1 and the second current value A2 are current values opposite in positive and negative and the absolute values of the first current value A1 and the second current value A2 may be equal. FIG. 13 illustrates that the first current value A1 is negative and the second current value A2 is positive.

The length of the first period TA1 is a value corresponding to the natural frequency of the first swing unit 21. The first swing unit 21 indicates, in the optical path control mechanism 12, portions (in the present embodiment, the optical member 20, the first movable unit 31, and the coils 41) that swing with respect to the supporting unit 27. That is, it can be said that the length of the first period TA1 is a value corresponding to the natural frequency of the portions that swing with respect to the supporting unit 27. More specifically, the length of the first period TA1 is preferably substantially the same value as the natural period of the first swing unit 21 and more preferably the same value as the natural period. Here, the natural period is the inverse of the natural frequency. "substantially the same value" means that a value deviating from the natural period by a degree of an error range is also allowed. For example, even when the deviation from the natural period is within 5% with respect to a value of the natural period, the value may be regarded as "substantially the same value". In the following explanation, the description of "substantially the same value" indicates the same meaning. Note that the value of the natural period (the inverse of the natural frequency) is represented as "1/f" [s] when the natural frequency is represented as f [Hz].

The current value of the drive signal is retained at the second current value A2 in the second period TB1 of the period T1. The second period TB1 is a period later than the first period TA1 and continuous to the first period TA1. Note that it is preferable to increase the natural frequency of the first swing unit 21 because the first period TA1 can be reduced and the second period TB1 can be increased (for example, set longer than the first period TA1.). Note that the current value being retained at the second current value A2 is not limited to the current value not strictly changing from the second current value A2 and may include the current value deviating from the second current value A2 in a predetermined value range. The predetermined value here may be optionally set but may be, for example, a value of 10% of the second current value A2.

As explained above, the current value of the drive signal gradually changes from the first current value A1 to the second current value A2 in the period T1 and, when the current value reaches the second current value A2, the current value is retained at the second current value A2.

The current value of the drive signal changes from the second current value A2 to the first current value A1 in the third period TA2 of the period T2. It can be said that the third period TA2 is a period later than the second period TB1 and continuous to the second period TB1. Furthermore, in the third period TA2, the current value of the drive signal linearly changes from the second current value A2 to the first current value A1 with elapse of time. That is, the current value of the drive signal is the second current value A2 at the start timing of the third period TA2 and, thereafter, changes linearly from the second current value A2, and the current value becomes the first current value A1 at the end timing of the third period TA2.

The length of the third period TA2 is a value corresponding to the natural frequency of the first swing unit 21. More specifically, the length of the third period TA2 is preferably substantially the same value as the natural period (the inverse of the natural frequency) of the first swing unit 21 and more preferably the same value as the natural period. In the third period TA2, the length of the third period TA2 is equal to the length of the first period TA1.

The current value of the drive signal is retained at the first current value A1 in the fourth period TB2 of the period T2. The fourth period TB2 is a period later than the third period TA2 and continuous to the third period TA2. The fourth period TB2 is a period earlier than the first period TA1 and continuous to the first period TA1. The fourth period TB2 is equal to the second period TB1. It is preferable to increase the natural frequency of the first swing unit 21 because the third period TA2 can be reduced and the fourth period TB2 can be increased (for example, can be set longer than the third period TA2). Note that the current value being retained at the first current value A1 is not limited to the current value not strictly changing from the first current value A1 and may include the current value deviating from the first current value A1 in a predetermined value range. The predetermined value here may be optionally set but may be, for example, a value of 10% of the first current value A1.

As explained above, the current value of the drive signal gradually changes from the second current value A2 to the first current value A1 in the period T2 and, when the current value reaches the first current value A1, the current value is retained at the first current value A1.

As explained above, in the present embodiment, the waveform of the drive signal has a trapezoidal shape and the first period TA1 and the third cycle TA2 in which the current value changes are values corresponding to the natural frequency of the swing unit 12A.

Note that a broken line illustrated in FIG. 13 indicates a period in which the light L is emitted. It is preferable that the irradiation device 100 does not emit the light L in the first period TA1 and emits the light L in the second period TB1. It is preferable that the irradiation device 100 does not emit the light L in the third period TA2 and emits the light L in the fourth period TB2.

Swing Pattern

Figure 14:
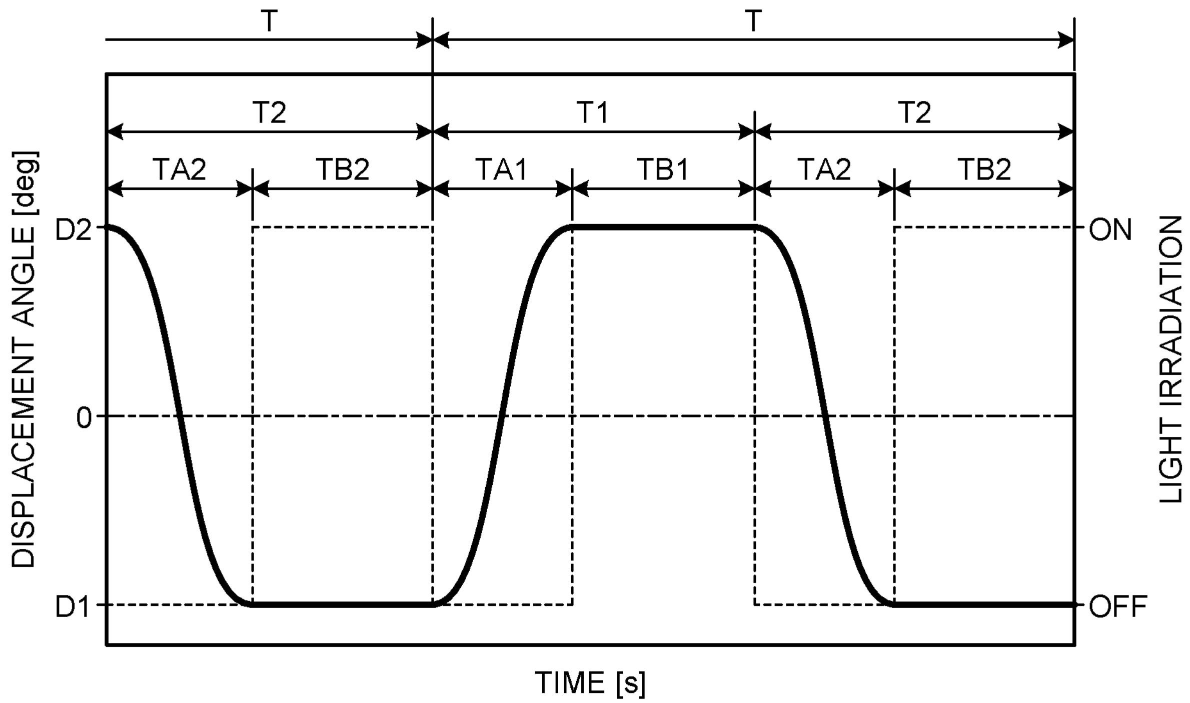
FIG. 14 is a graph for explaining a uniaxial swing pattern of an optical unit.

Next, a swing pattern of the first swing unit 21 by application of a drive signal is explained. FIG. 14 is a graph illustrating a uniaxial swing pattern of the optical unit.

As illustrated in FIG. 14, the swing pattern of the first swing unit 21 indicates a displacement angle (an angle around the first swing axis AX) of the first swing unit 21 in each time at the time when a drive signal is applied to the first actuator 25. In FIG. 14, the swing pattern is indicated by a solid line.

In the first period TA1, the current value of the drive signal changes from the first current value A1 to the second current value A2. Consequently, the displacement angle of the first swing unit 21 changes from the first angle D1 to the second angle D2 in the first period TA1. Here, the intermediate position 0 between the first angle D1 and the second angle D2 is a position where the displacement angle of the first swing unit 21 is 0.

In the second period TB1, the current value of the drive signal is retained at the second current value A2. Consequently, the displacement angle of the first swing unit 21 is retained at the second angle D2 in the second period TB1. Note that holding the displacement angle at the second angle D2 is not limited to the displacement angle not strictly changing from the second angle D2 and may include the displacement angle deviating from the second angle D2 in a range of a predetermined value. The predetermined value here may be optionally set but may be, for example, a value of 10% of the second angle D2.

In the third period TA2, the current value of the drive signal changes from the second current value A2 to the first current value A1. Consequently, the displacement angle of the first swing unit 21 changes from the second angle D2 to the first angle D1 in the third period TA2.

In the fourth period TB2, the current value of the drive signal is retained at the first current value A1. As a result, the displacement angle of the first swing unit 21 is retained at the first angle D1 in the fourth period TB2. Note that holding the displacement angle at the first angle D1 is not limited to the displacement angle not strictly changing from the first angle D1 and may include the displacement angle deviating from the first angle D1 in a predetermined value range. The predetermined value here may be optionally set, but may be, for example, a value of 10% of the first angle D1.

Note that the light L is emitted in the second period TB1 and the fourth period TB2. Therefore, in the second period TB1, the first swing unit 21 retained at the second angle D2 is irradiated with the light L and the optical path of the light L is in the first position. In the fourth period TB2, the first swing unit 21 retained at the first angle D1 is irradiated with the light L, the optical path of the light L shifts to the second position, and the image shifts by a half pixel.

In the optical path control device 10 that swings the optical member 20 to shift the optical path, it is required to stably swing the optical member 20. In the present embodiment, by setting the lengths of the first period TA1 and the third period TA2 to the values corresponding to the natural frequency of the first swing unit 21, it is possible to suppress the vibration of the first swing unit 21 and stably swing the first swing unit 21 in the second period TB1 and the fourth period TB2. That is, since the lengths of the first period TA1 and the third period TA2 are the values corresponding to the natural frequency of the first swing unit 21, it is possible to suppress the vibration of the first swing unit 21 in the second period TB1 and the fourth period TB2 and stably swing the first swing unit 21. Therefore, it is possible to swing the first swing unit 21 at high speed and stably stop the first swing unit 21 to suppress deterioration of the image.

As the drive signal applied from the drive circuit 16 to the actuator 12B, the drive signal applied to the first actuator 25 is explained above. Note that, since the same applies to the drive signal applied to the second actuator 26, explanation of the drive signal is omitted.

Operation of Pixels by the Optical Path Control Mechanism

Figure 16:
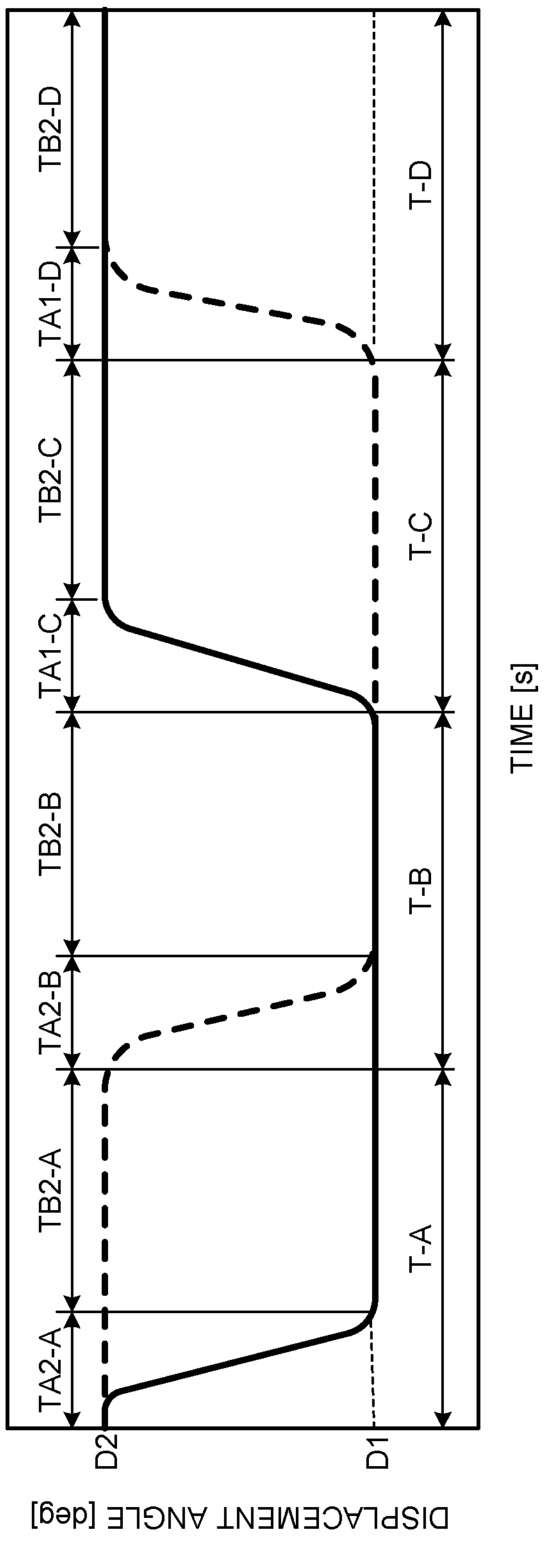
FIG. 16 is a graph for explaining the biaxial swing pattern of the optical unit.

In the following explanation, operation at the time when the first swing unit 21 and the second swing unit 22 are swung is explained. FIG. 16 is an explanatory diagram for explaining a biaxial swing pattern of the optical unit.

In the optical path control mechanism 12 in the present embodiment, the first actuator 25 and the second actuator 26 configuring the actuator 12B swing the first swing unit 21 and the second swing unit 22 to repeat a posture change from the first angle D1 to the second angle D2 around the first shaft unit AX and the second shaft unit BX and a posture change from the second angle D2 to the first angle D1 respectively according to drive signals. According to the combination of the first swing unit 21 and the second swing unit 22, the optical axis of the light L is repeatedly shifted from the first position to the second position, from the second position to the third position, from the third position to the fourth position, and from the fourth position to the first position.

That is, the image projected onto the screen by the light L when the optical axis is in the first position and the image projected onto the screen by the light L when the optical axis is in the second position are shifted by a half pixel. Similarly, the images are shifted by a half pixel when the optical axis is in the third position and the fourth position. That is, the image projected onto the screen is always displayed to be shifted upward or downward, to the left or the right, or diagonally. Consequently, an apparent number of pixels increases and the resolution of the image projected onto the screen can be increased. Since the shift amount of the optical axis is for a half pixel of the image, the first angle D1 and the second angle D2 are set to angles at which the image can be shifted by a half pixel. Note that the shift amount of the image is not limited to a half pixel and may be optional, for example, a ¼ or ⅛ of the pixel. The first angle D1 and the second angle D2 may also be set as appropriate according to the shift amount of the image.

Figure 15:
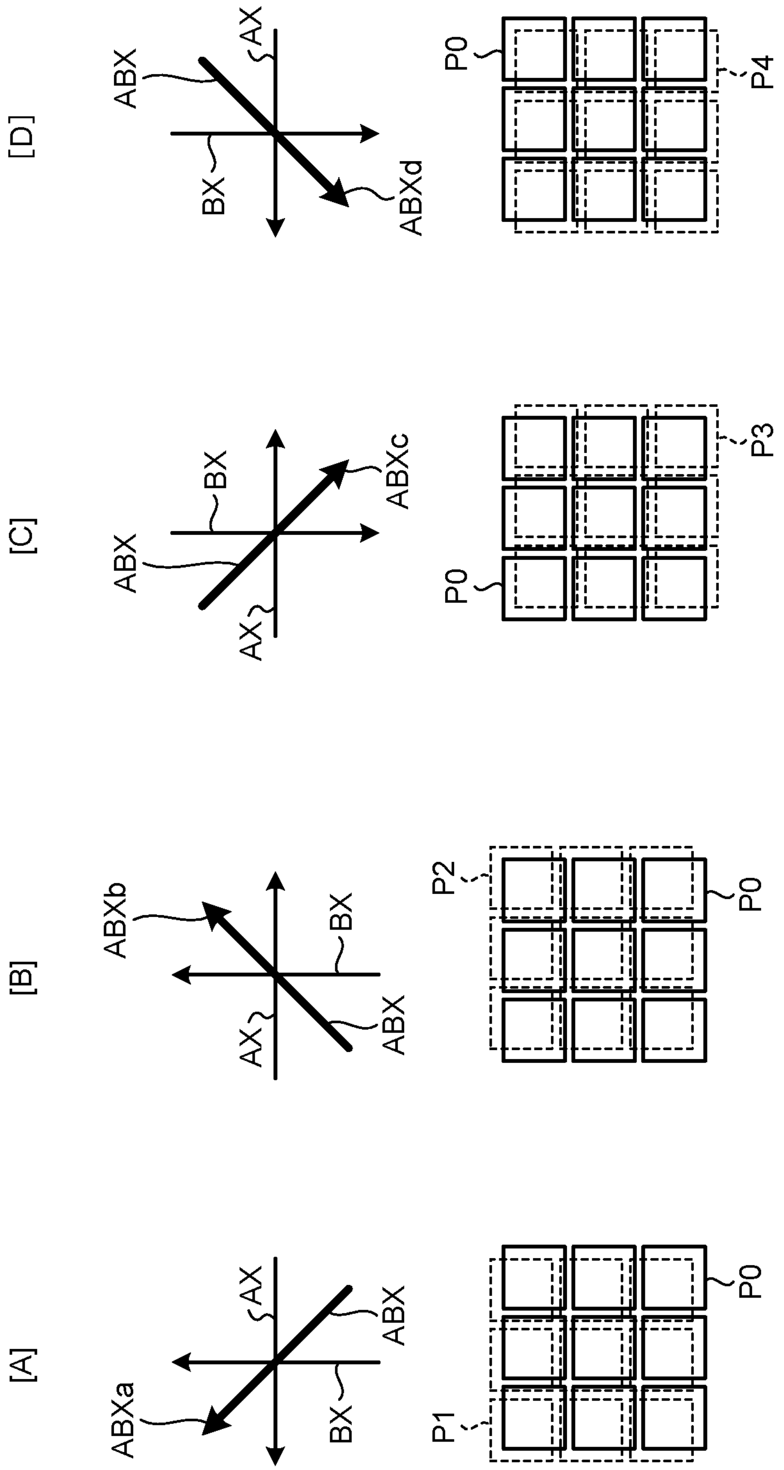
FIG. 15 is an explanatory diagram for explaining a biaxial swing pattern of the optical unit.

In the following explanation, a specific description is made. Here, the first swing axis AX direction and the second swing axis BX direction intersect the orthogonal direction and are parallel to the pixel array direction. As illustrated in FIG. 15, the image position P0 is a display position at the time when the current value applied to the first actuator 25 and the second actuator 26 is 0, that is, when the displacement angle of the optical member 20 is 0. The A operation state is a state in which the optical member 20 is swung around the first swing axis AX by a predetermined angle by the first actuator 25, the image position P0 is shifted by a ¼ pixel in the second swing axis BX direction, the optical member 20 is swung around the second swing axis BX by a predetermined angle by the second actuator 26, and the image position P0 is shifted by a ¼ pixel in the first swing axis AX direction. That is, the A operation state is a state in which an image is displayed in the image position P1 where the image position P0 is shifted to one side ABXa in an ABX direction obtained by combining a vector directed to one side in the first swing axis AX direction and a vector directed to one side in the second swing axis BX direction.

Similarly, the B operation state is a state in which an image is displayed in an image position P2 where the image position P0 is shifted to one side ABXb in the ABX direction obtained by combining the vector directed to one side in the first swing axis AX direction and the vector directed to one side in the second swing axis BX direction. Similarly, the C operation state is a state in which an image is displayed in an image position P3 where the image position P0 is shifted to one side ABXc in the ABX direction obtained by combining the vector directed to one side in the first swing axis AX direction and the vector directed to one side in the second swing axis BX direction. Similarly, the D operation state is a state in which an image is displayed in an image position P4 where the image position P01 is shifted to one side ABXd in the ABX direction obtained by combining the vector directed to one side in the first swing axis AX direction and the vector directed to one side in the second swing axis BX direction.

Swing patterns of the first swing unit 21 and the second swing unit 22 in the operation states of the pixels explained above are explained. FIG. 16 is a graph for explaining a biaxial swing pattern of the optical unit.

In the following explanation, the swing pattern of the first swing unit 21 indicates a displacement angle (an angle around the first swing axis AX) of the first swing unit 21 in each time at the time when a drive signal is applied to the first actuator 25. The swing pattern is indicated by a solid line. The swing pattern of the second swing unit 22 indicates a displacement angle (an angle around the second swing axis BX) of the second swing unit 22 in each time at the time when a drive signal is applied to the second actuator 26. The swing pattern is indicated by a dotted line.

As illustrated in FIG. 16, in the displacement period TA2-A, the current value of the drive signal applied to the first actuator 25 changes from the second current value A2 to the first current value A1 (see FIG. 13). Consequently, the displacement angle of the first swing unit 21 changes from the second angle D2 to the first angle D1 in the displacement period TA2-A. In the displacement period TA2-α, the current value of the drive signal applied to the second actuator 26 changes from the second current value A2 to the first current value A1. Consequently, the displacement angle of the second swing unit 22 changes from the second angle D2 to the first angle D1 in the displacement period TA2-B.

In the displacement period TA1-C, the current value of the drive signal applied to the first actuator 25 changes from the first current value A1 to the second current value A2. Consequently, the displacement angle of the first swing unit 21 changes from the first angle D1 to the second angle D2 in the displacement period TA1-C. In the displacement period TA1-D, the current value of the drive signal applied to the second actuator 26 changes from the first current value A1 to the second current value A2. Consequently, the displacement angle of the second swing unit 22 changes from the first angle D1 to the second angle D2 in the displacement period TA1-D.

The displacement period TA2-A, the displacement period TA2-B, the displacement period TA1-C, and the displacement period TA1-D respectively represent periods for shifting to the A operation state, the B operation state, the C operation state, and the D operation state explained with reference to FIG. 15. When the natural frequencies of the first swing unit 21 and the second swing unit 22 are the same, for example, since the lengths of the displacement period TA2-A and the displacement period TA2-B are the same, the lengths of the display period TB2-A and the display period TB2-B at the time when an electric current is maintained are the same, the appearance of the image is the same in the A operation state and the B operation state, and the deterioration in image quality is suppressed.

Incidentally, for example, when image data having 8K resolution is displayed on a display device having 4K resolution, a display period of one frame is divided into display periods of a plurality of subframes and the plurality of subframes are displayed in the display period of one frame. That is, when one frame is 60 Hz video data and divided into four subframes, in one subframe period, a predetermined gradation has to be displayed in a very short time of 240 Hz. In a light modulation element including liquid crystal, even when a voltage is applied, a modulation factor of a liquid crystal element does not change immediately to a value corresponding to the applied voltage but changes relatively slowly. Therefore, in a short time, the predetermined gradation cannot be displayed or brightness changes to brightness in a display period of the next subframe while a display position being shifted. Therefore, the resolution is deteriorated.

Frame Division Configuration

Figure 17:
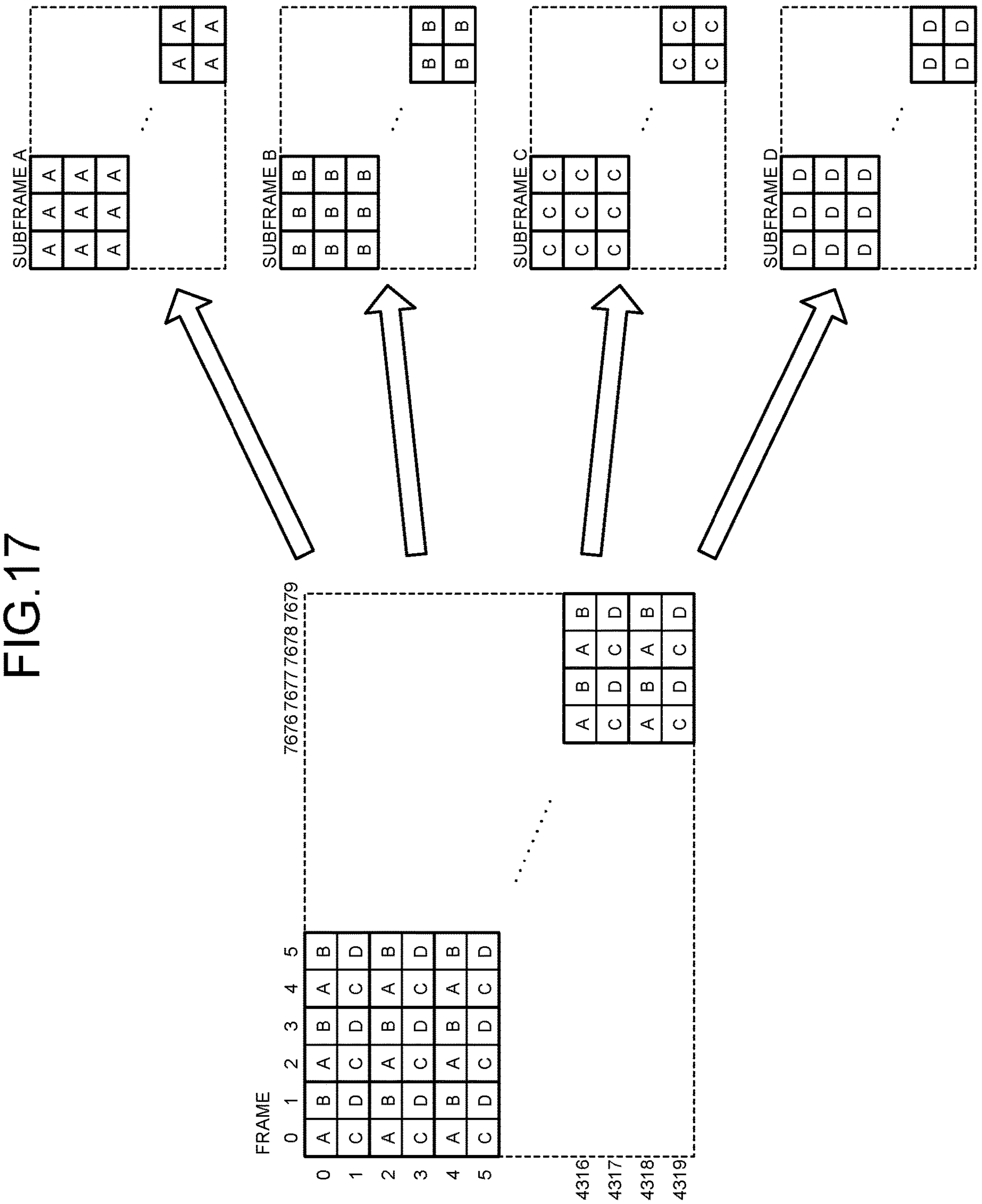
FIG. 17 is an explanatory diagram illustrating a frame division configuration by a processing unit.

FIG. 17 is an explanatory diagram illustrating a frame division configuration by the processing unit.

As illustrated in FIG. 17, one frame configuring video data having 8K resolution is configured by arranging a plurality of combinations of four pixels A, B, C, and D in columns and rows. Subframes are configured by video data to be displayed on a display device having 4K resolution. A plurality of pixels A, B, C, and D configuring one frame is divided into four subframes A, B, C, and D. In this case, the subframe A is obtained by extracting only a plurality of pixels A configuring one frame. In this case, the subframe A displays only one pixel A in the positions of the four pixels A, B, C, and D of the frame. Similarly, the subframe B is obtained by extracting only a plurality of pixels B configuring one frame. The subframe C is obtained by extracting only a plurality of pixels C configuring one frame. The subframe D is obtained by extracting only a plurality of pixels D configuring one frame. As explained above, the video data of the frame having the 8K resolution is displayed as the video data of the subframe having the 4K resolution.

Display Method for Subframes

Figure 18:
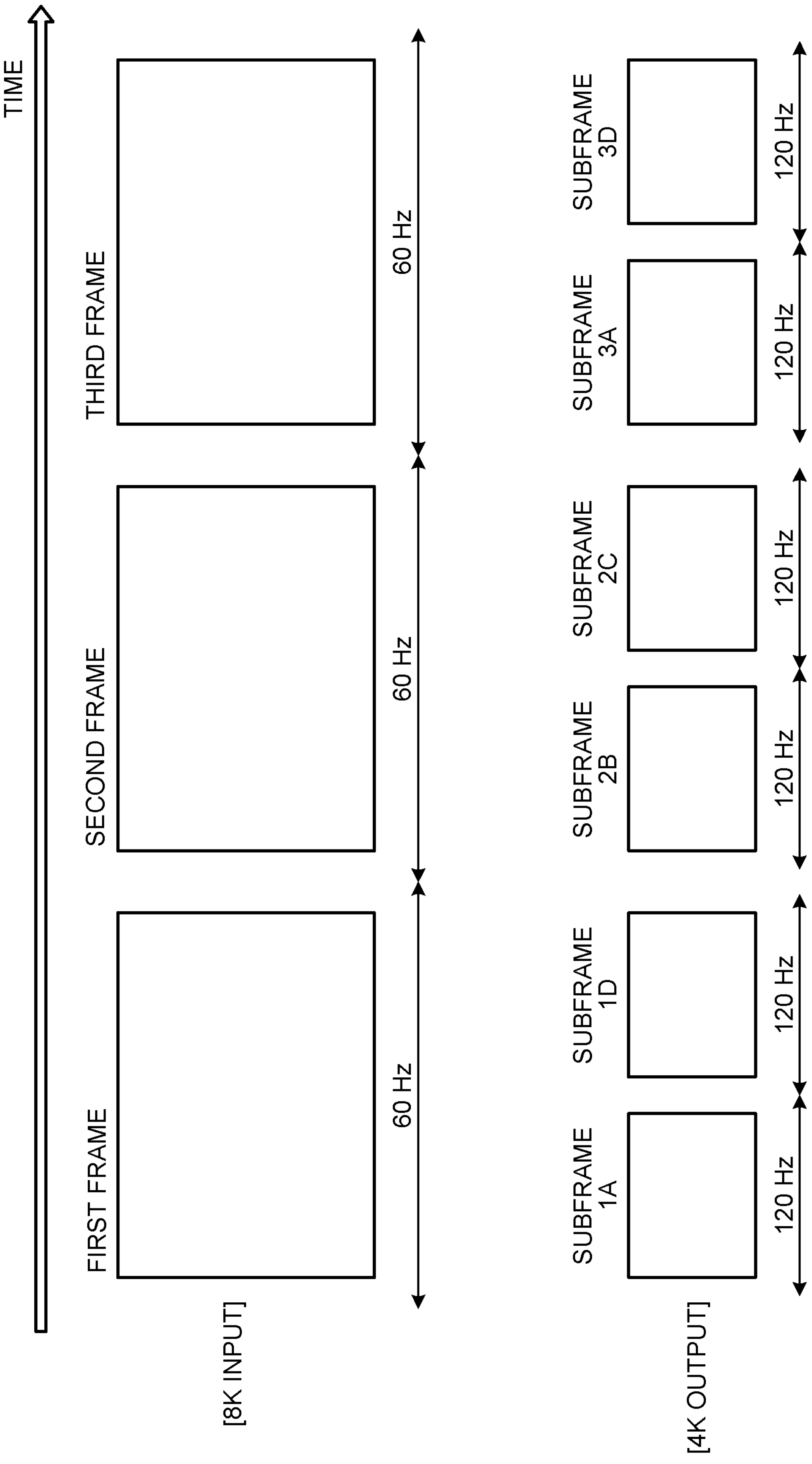
FIG. 18 is an explanatory diagram illustrating a display method for a 4K output image with respect to an 8K input image.
Figure 19:
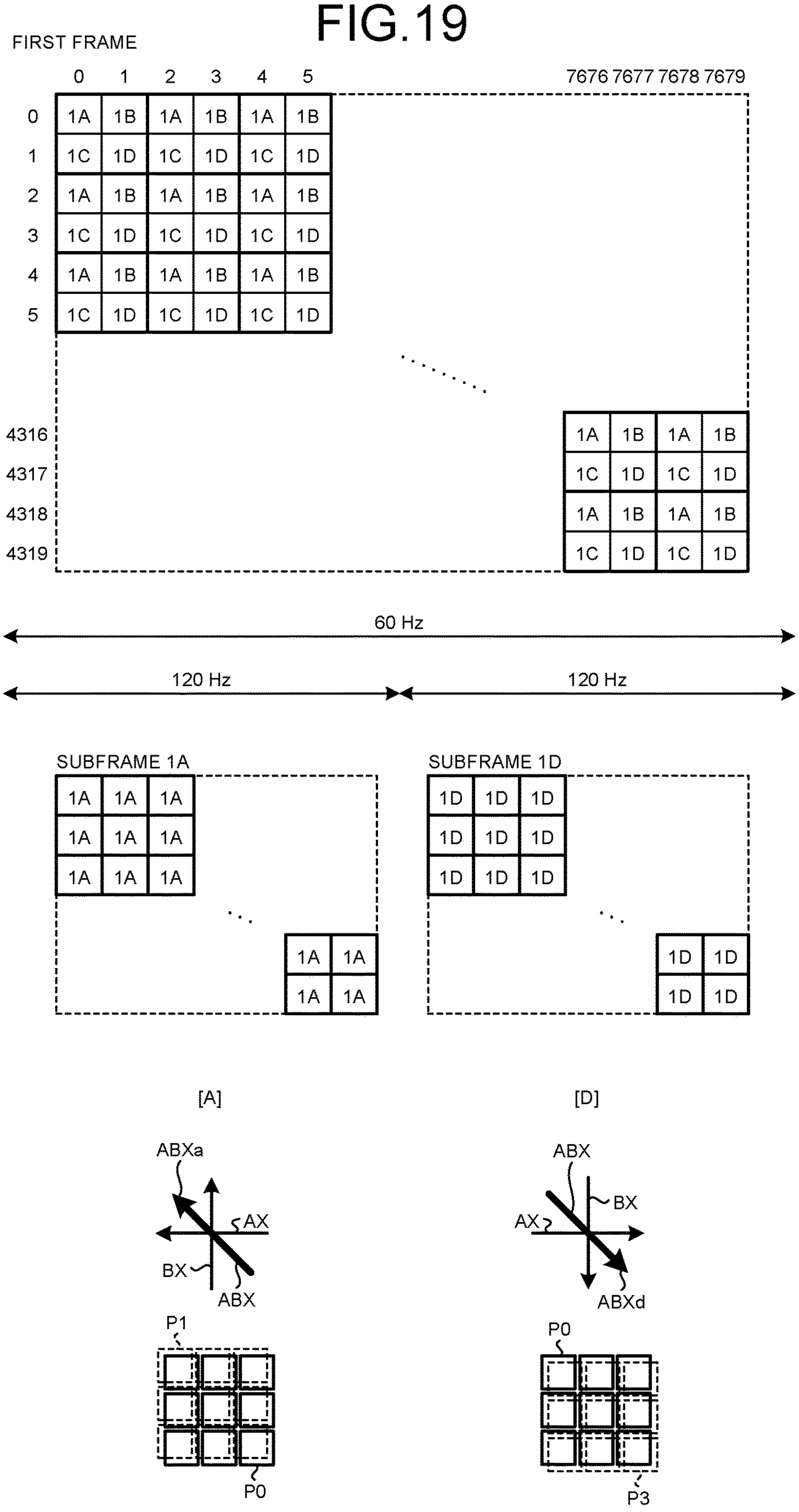
FIG. 19 is an explanatory diagram illustrating a display method for subframes with respect to a first frame.
Figure 20:
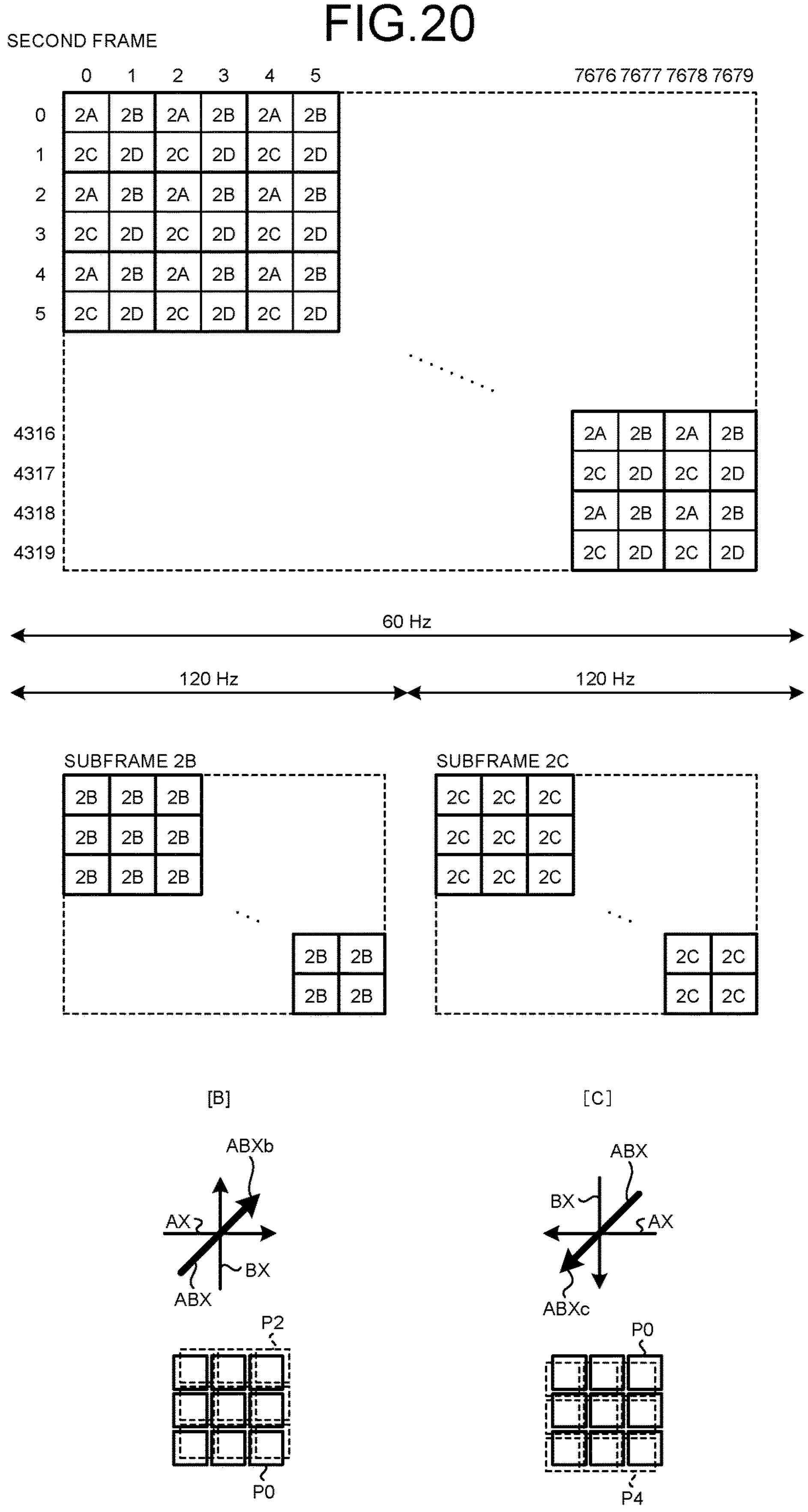
FIG. 20 is an explanatory diagram illustrating a display method for subframes with respect to a second frame.
Figure 21:
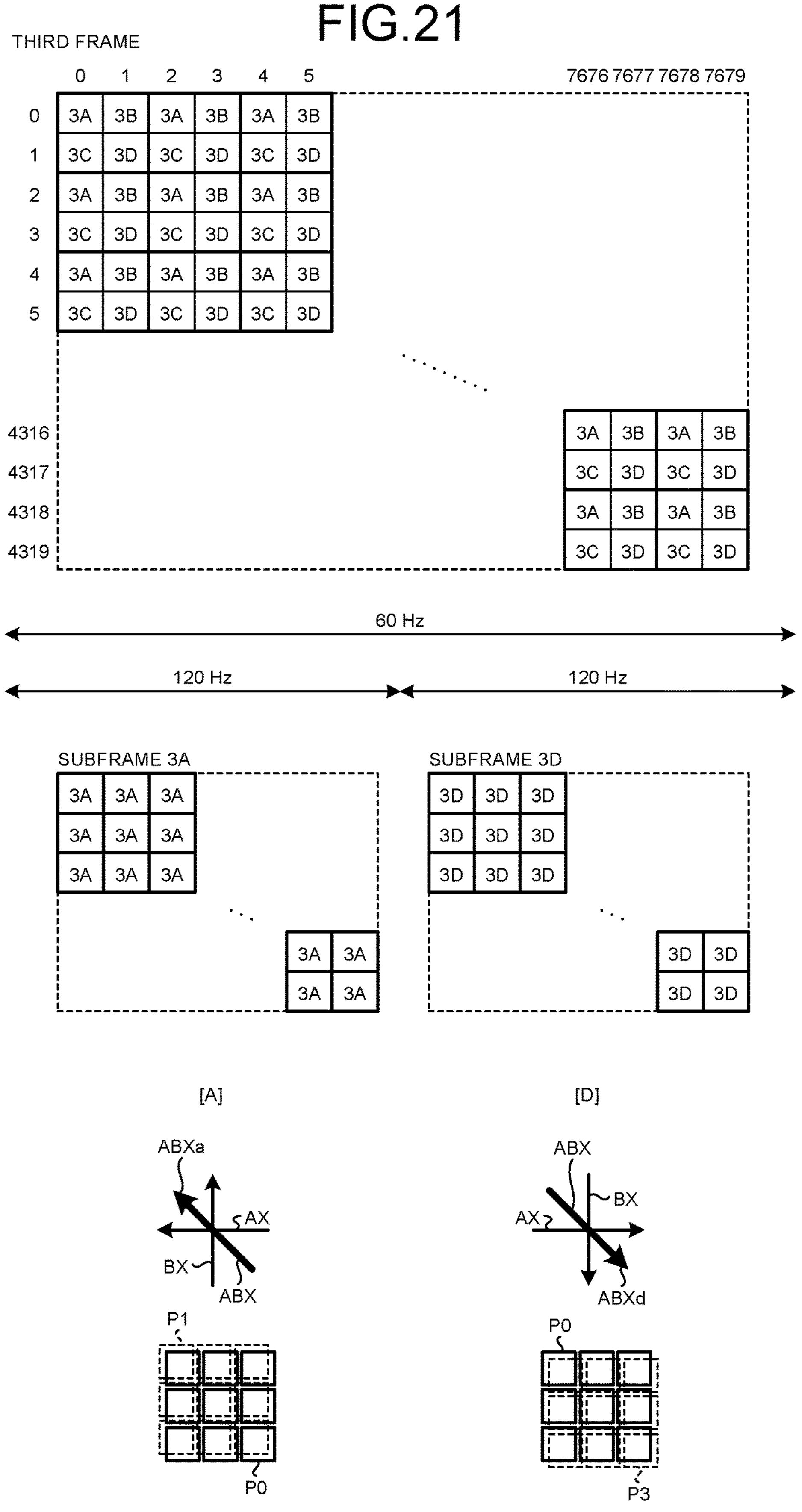
FIG. 21 is an explanatory diagram illustrating a display method for subframe with respect to a third frame.
Figure 22:
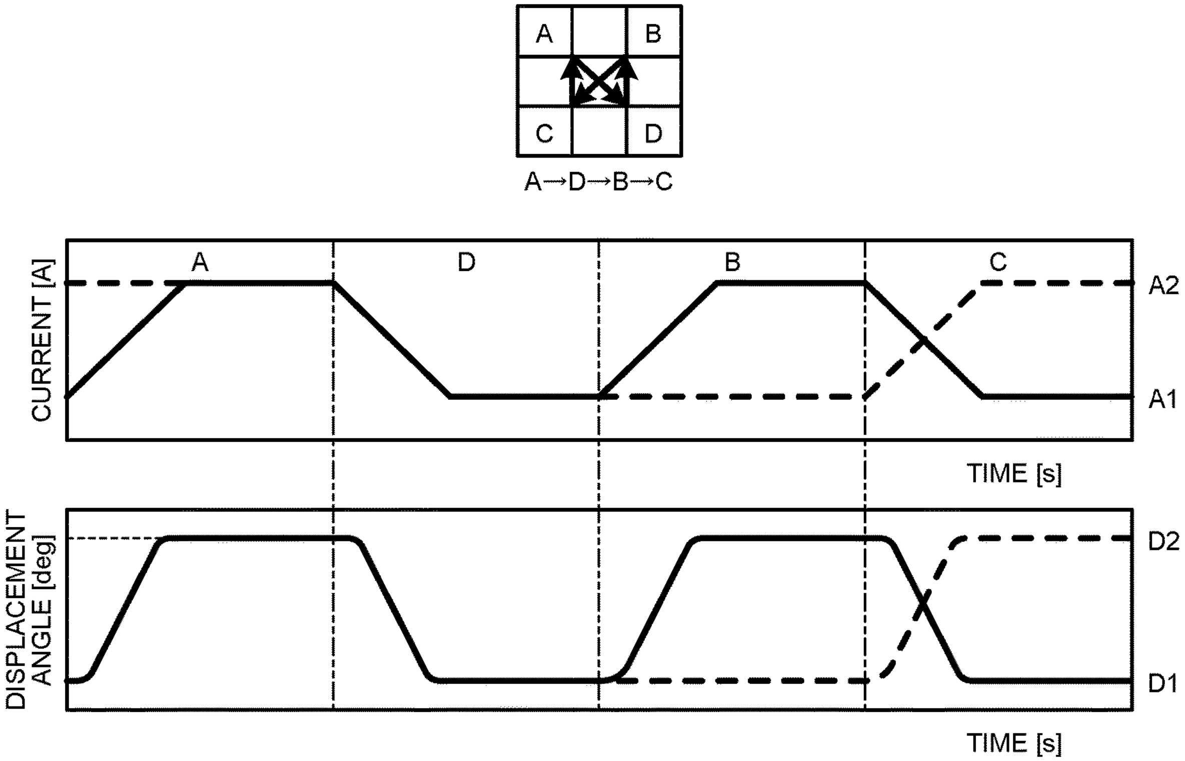
FIG. 22 is a graph for explaining a biaxial swing pattern of the optical unit at the time when the subframes with respect to the first frame and the second frame are displayed.

FIG. 18 is an explanatory diagram illustrating a display method for a 4K output image with respect to an 8K input image, FIG. 19 is an explanatory diagram illustrating a display method for subframes with respect to a first frame, FIG. 20 is an explanatory diagram illustrating a display method for subframes with respect to a second frame, FIG. 21 is an explanatory diagram illustrating a display method for subframes with respect to a third frame, and FIG. 22 is a graph illustrating a biaxial swing pattern of the optical unit at the time when subframes with respect to the first frame and the second frame are displayed. Note that, in FIG. 22, a current value and a displacement angle of the first actuator 25 are indicated by solid lines and a current value and a displacement angle of the second actuator 26 are indicated by dotted lines.

In the present embodiment, as illustrated in FIG. 2, the video signal processing circuit 160 controls the display elements 106R, 106G, and 106B such that a part of a first subframe group among a plurality of (in the present embodiment, four) subframes obtained by dividing the first frame into a plurality of frames is sequentially displayed within a time for displaying the first frame. The video signal processing circuit 160 controls the display elements 106R, 106G, and 106B such that a second subframe group different from the part of the first subframe group among a plurality of subframes obtained by dividing the second frame into a plurality of frames is sequentially displayed within a time for displaying the second frame following the first frame. Then, the control circuit 14 generates a digital drive signal based on a synchronization signal input from the video signal processing circuit 160. The drive circuit 16 drives the actuator 12B based on the drive signal to swing the swing unit 12A.

In the following explanation, a specific description is made. As illustrated in FIG. 2 and FIG. 18, the first frame, the second frame, the third frame, and the like are successively input to the video signal processing circuit 160 as video data having 8K resolution. The frames are respectively 60 Hz video data. The video signal processing circuit 160 divides each of the first frame, the second frame, the third frame, and the like into four subframes A, B, C, and D.

The video signal processing circuit 160 controls the display elements 106R, 106G, and 106B such that two subframes 1A and 1D (a first subframe group) among four divided subframes 1A, 1B, 1C, and 1D are sequentially displayed within a time (60 Hz) for displaying the first frame. At this time, the time for displaying the subframes 1A and 1D is a ½ time (120 Hz) of the time for displaying the first frame (60 Hz). Subsequently, the video signal processing circuit 160 controls the display elements 106R, 106G, and 106B such that two subframes 2B and 2C (a second subframe group) among four divided subframes 2A, 2B, 2C, and 2D are sequentially displayed within a time (60 Hz) for displaying the second frame. At this time, the time for displaying the subframes 2B and 2C is a ½ time (120 Hz) of the time for displaying the second frame (60 Hz).

Subsequently, the video signal processing circuit 160 controls the display elements 106R, 106G, and 106B such that two subframes 3A and 3D (a third subframe group) among four divided subframes 3A, 3B, 3C, and 3D are sequentially displayed within a time (60 Hz) for displaying the third frame. At this time, the time for displaying the subframes 3A and 3D is a ½ time (120 Hz) of the time for displaying the third frame (60 Hz). The same applies to processing for the fourth and subsequent frames by the video signal processing circuit 160.

That is, as illustrated in FIG. 2 and FIG. 19, the first frame is configured by arranging a plurality of combinations of the four pixels 1A, 1B, 1C, and 1D in columns and rows. The subframe 1A is configured by extracting only a plurality of pixels A in the first frame. The subframe 1D is configured by extracting only a plurality of pixels D in the first frame. Here, the first subframe group corresponding to the first frame is the subframe 1A and the subframe 1D and is a first front subframe and a first rear subframe respectively corresponding to the first pixel 1A and the fourth pixel 1D that are not adjacent among the four kinds of pixels 1A, 1B, 1C, and 1D. The video signal processing circuit 160 controls the display elements 106R, 106G, and 106B such that the two subframes 1A and 1D are sequentially displayed within the time for displaying the first frame.

At this time, as illustrated in FIG. 2, FIG. 19, and FIG. 22, the control circuit 14 generates a digital drive signal based on a synchronization signal input from the video signal processing circuit 160 and the drive circuit 16 drives the actuators 25 and 26 based on the drive signal. That is, when the subframe 1A is displayed, the drive circuit 16 applies the second current value A2 to the first actuator 25 and the second actuator 26 to set the second angle D2. Then, the first actuator 25 swings the optical member 20 (see FIG. 3) around the first swing axis AX and shifts the image position P0 by a ¼ pixel in the second swing axis BX direction. The second actuator 26 swings the optical member 20 around the second swing axis BX to bring the optical member 20 into the A operation state in which the image position P0 is shifted by a ¼ pixel in the first swing axis AX direction. That is, an image is displayed in the image position P1 where the image position P0 is shifted to one side ABXa in the ABX direction.

Thereafter, when the subframe 1D is displayed, the drive circuit 16 applies the first current value A1 to the first actuator 25 and the second actuator 26 to set the first angle D1. Then, the first actuator 25 swings the optical member 20 (see FIG. 3) around the first swing axis AX and shifts the image position P0 by a ¼ pixel in the second swing axis BX direction. The second actuator 26 swings the optical member 20 around the second swing axis BX to bring the optical member 20 into the D operation state in which the image position P0 is shifted by a ¼ pixel in the first swing axis AX direction. That is, an image is displayed in the image position P3 where the image position P0 is shifted to one side ABXd in the ABX direction.

Subsequently, as illustrated in FIG. 2 and FIG. 20, like the first frame, the second frame is configured by arranging a plurality of combinations of four pixels 2A, 2B, 2C, and 2D in columns and rows. The subframe 2B is configured by extracting only a plurality of pixels B in the second frame. The subframe 2C is configured by extracting only a plurality of pixels C in the second frame. Here, the second subframe group corresponding to the second frame is the subframe 2B and the subframe 2C and is a second front subframe and a second rear subframe respectively corresponding to the second pixel 2B and the third pixel 2C that are not adjacent among the four kinds of pixels 2A, 2B, 2C, and 2D. The video signal processing circuit 160 controls the display elements 106R, 106G, and 106B such that the two subframes 2B and 2C are sequentially displayed within the time for displaying the second frame.

At this time, as illustrated in FIG. 2, FIG. 20, and FIG. 22, the control circuit 14 generates a digital drive signal based on a synchronization signal input from the video signal processing circuit 160 and the drive circuit 16 drives the actuators 25 and 26 based on the drive signal. That is, when the subframe 2B is displayed, the drive circuit 16 applies the second current value A2 to the first actuator 25 to set the second angle D2 and applies the first current value A1 to the second actuator 26 to set the first angle D1. Then, the first actuator 25 swings the optical member 20 (see FIG. 3) around the first swing axis AX and shifts the image position P0 by a ¼ pixel in the second swing axis BX direction. The second actuator 26 swings the optical member 20 around the second swing axis BX to bring the optical member 20 into the B operation state in which the image position P0 is shifted by a ¼ pixel in the first swing axis AX direction. That is, an image is displayed in the image position P2 where the image position P0 is shifted to one side ABXb in the ABX direction.

Thereafter, when the subframe 2C is displayed, the drive circuit 16 applies the first current value A1 to the first actuator 25 to set the first angle D1 and applies the second current value A2 to the second actuator 26 to set the second angle D2. Then, the first actuator 25 swings the optical member 20 (see FIG. 3) around the first swing axis AX and shifts the image position P0 by a ¼ pixel in the second swing axis BX direction. The second actuator 26 swings the optical member 20 around the second swing axis BX to bring the optical member 20 into the C operation state in which the image position P0 is shifted by a ¼ pixel in the first swing axis AX direction. That is, an image is displayed in the image position P4 where the image position P0 is shifted to one side ABXc in the ABX direction.

Subsequently, as illustrated in FIG. 2 and FIG. 21, like the first frame and the second frame, the third frame is configured by arranging a plurality of combinations of four pixels 3A, 3B, 3C, and 3D in columns and rows. The subframe 3A is configured by extracting only a plurality of pixels A in the third frame. The subframe 3D is configured by extracting only a plurality of pixels D in the third frame. Here, the third subframe group corresponding to the third frame is the subframe 3A and the subframe 3D and is a third front subframe and a third rear subframe respectively corresponding to the first pixel 3A and the fourth pixel 3D that are not adjacent among the four kinds of pixels 3A, 3B, 3C, and 3D. The video signal processing circuit 160 controls the display elements 106R, 106G, and 106B such that the two subframes 3A and 3D are sequentially displayed within a time for displaying the third frame.

At this time, as illustrated in FIG. 2, FIG. 19, and FIG. 22, the control circuit 14 generates a digital drive signal based on a synchronization signal input from the video signal processing circuit 160 and the drive circuit 16 drives the actuators 25 and 26 based on the drive signal. That is, when the subframe 3A is displayed, the drive circuit 16 applies the second current value A2 to the first actuator 25 and the second actuator 26 to set the second angle D2. Then, the first actuator 25 swings the optical member 20 (see FIG. 3) around the first swing axis AX and shifts the image position P0 by a ¼ pixel in the second swing axis BX direction. The second actuator 26 swings the optical member 20 around the second swing axis BX to bring the optical member 20 into the A operation state in which the image position P0 is shifted by a ¼ pixel in the first swing axis AX direction. That is, an image is displayed in the image position P1 where the image position P0 is shifted to one side ABXa in the ABX direction.

Thereafter, when the subframe 3D is displayed, the drive circuit 16 applies the first current value A1 to the first actuator 25 and the second actuator 26 to set the first angle D1. Then, the first actuator 25 swings the optical member 20 (see FIG. 3) around the first swing axis AX and shifts the image position P0 by a ¼ pixel in the second swing axis BX direction. The second actuator 26 swings the optical member 20 around the second swing axis BX to bring the optical member 20 into the D operation state in which the image position P0 is shifted by a ¼ pixel in the first swing axis AX direction. That is, an image is displayed in the image position P3 where the image position P0 is shifted to one side ABXd in the ABX direction.

In the above explanation, when the video signal processing circuit 160 continuously displays a plurality of frames, the display elements 106R, 106G, and 106B are controlled such that different subframe groups are alternately displayed. That is, the video signal processing circuit 160 displays the subframes 1A and 1D corresponding to the first frame, the subframes 2B and 2C corresponding to the second frame, the subframes 3A and 3D corresponding to the third frame, the subframes 4B and 4C corresponding to the fourth frame, and the like in this order. However, this method is not limiting. For example, when the video signal processing circuit 160 continuously displays a plurality of frames, the display elements 106R, 106G, and 106B may be controlled such that pixels of adjacent subframe groups to be continuously displayed are different.

Figure 23:
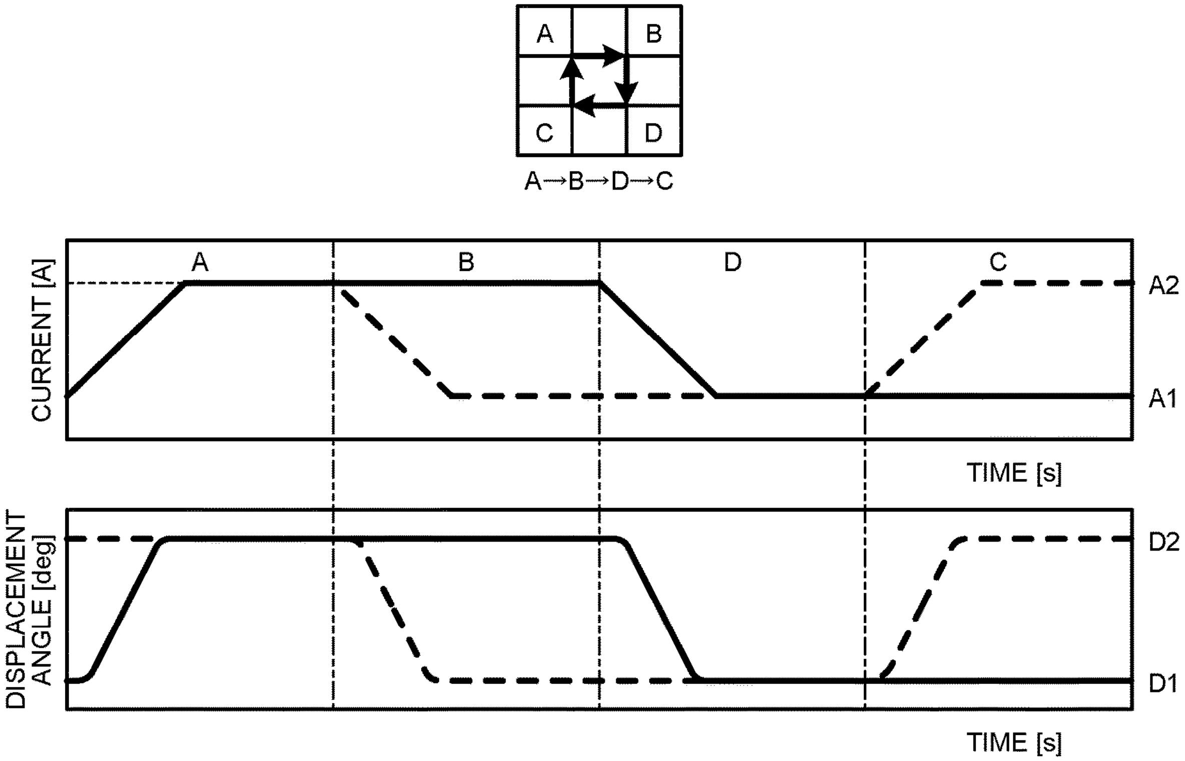
FIG. 23 is a graph for explaining another biaxial swing pattern of the optical unit at the time when the subframes with respect to the first frame and the second frame are displayed.

FIG. 23 is a graph for explaining another biaxial swing pattern of the optical unit at the time when the subframes with respect to the first frame and the second frame are displayed.

As illustrated in FIG. 23, it is assumed that the first subframe group corresponding to the first frame is the subframe 1A and the subframe 1B and the second subframe group corresponding to the second frame is the subframe 2D and the subframe 2C.

When the subframe 1A is displayed, the drive circuit 16 applies the second current value A2 to the first actuator 25 and the second actuator 26 to set the second angle D2. Then, the optical member 20 (see FIG. 3) swings around the first swing axis AX and the second swing axis BX to come into the A operation state and an image is displayed in the image position P1. When the subframe 1B is displayed, the drive circuit 16 applies the second current value A2 to the first actuator 25 to set the second angle D2 and applies the first current value A1 to the second actuator 26 to set the first angle D1. Then, the optical member 20 (see FIG. 3) swings around the first swing axis AX and the second swing axis BX to come into the B operation state and displays an image in the image position P2.

Subsequently, when the subframe 2D is displayed, the drive circuit 16 applies the first current value A1 to the first actuator 25 and the second actuator 26 to set the first angle D1. Then, the optical member 20 (see FIG. 3) swings around the first swing axis AX and the second swing axis BX to come into the D operation state and displays an image in the image position P3. When the subframe 2C is displayed, the drive circuit 16 applies the first current value A1 to the first actuator 25 to set the first angle D1 and applies the second current value A2 to the second actuator 26 to set the second angle D2. Then, the optical member 20 (see FIG. 3) swings around the first swing axis AX and the second swing axis BX to come into the C operation state and displays an image in the image position P4.

Effects

As explained above, the optical path control device according to the present embodiment includes the swing unit 12A including the optical member (the optical unit) 20 on which light is made incident, the first swing unit 21 that supports the optical member 20, and the second swing unit 22 that swingably supports the first swing unit 21, the first actuator 25 that swings the swing unit 12A centering on the first swing axis AX, the second actuator 26 that swings the swing unit 12A centering on the second swing axis BX, and the drive circuit (the drive unit) 16 that applies a drive signal of a current value to the first actuator 25 and the second actuator 26. When applying a drive signal for setting the current value to a preset predetermined current value to one of the first actuator 25 and the second actuator 26 to maintain the first swing unit 21 or the second swing unit 22 in an inclined position inclined with respect to a reference position, the drive circuit 16 applies a drive signal for setting the current value to 0 to the other to maintain the first swing unit 21 or the second swing unit 22 in the reference position.

With the optical path control device in the present embodiment, when the predetermined current value is applied to one of the first actuator 25 and the second actuator 26 to maintain the first swing unit 21 or the second swing unit 22 in the inclined position, the current value 0 is applied to the other of the first actuator 25 and the second actuator 26 to maintain the first swing unit 21 or the second swing unit 22 in the reference position. Therefore, when one of the first actuator 25 and the second actuator 26 is driven, the other is stopped. The power consumption of the actuators 25 and 26 can be reduced and the control of the actuators 25 and 26 can be simplified.

In the optical path control device according to the present embodiment, the first swing axis AX and the second swing axis BX are arranged to be orthogonal to each other and are arranged to be shifted by 45 degrees with respect to the array direction of the pixels of the optical member. Therefore, when the displacement angle of the optical member 20 is changed and the optical path control is performed, only one of the first actuator 25 and the second actuator 26 has to be driven. The control of the actuators 25 and 26 can be simplified.

In the optical path control device according to the present embodiment, the drive signal of the current value applied to the first actuator 25 and the second actuator 26 by the drive circuit 16 has a waveform formed in a staircase shape. Therefore, since the first actuator 25 and the second actuator 26 are driven by the drive signal having the waveform formed in the staircase shape, the first swing unit 21 and the second swing unit 22 can be accurately stopped in predetermined positions.

The optical path control device according to the present embodiment includes the swing unit 12A including the optical member (the optical unit) 20 on which light is made incident, the actuator 12B that swings the swing unit 12A, and the drive circuit (the drive unit) 16 that applies a drive signal of a current value to the actuator 12B. The drive circuit 16 applies a ½ current value of a peak current value in a ½ period of a cycle of the natural vibration of the swing unit 12A and, thereafter, maintains the current value at the peak current value or the current value 0.

With the optical path control device in the present embodiment, by applying a ½ current value of the peak current value for a ½ period of the period of the natural vibration of the swing unit 12A and, thereafter, maintaining the current value at the peak current value or the current value 0, the swing unit 12A can be easily stopped in the predetermined position and the power consumption of the actuators 25 and 26 can be reduced. Since the displacements of the axes for inclining the optical member are independent, it is not necessary to adjust the balance of the displacement amounts of the respective two axes and the control of the actuators 25 and 26 can be simplified. Since the A operation position and the C operation position are determined by the displacement of the first swing unit and the B operation position and the D operation position are determined by the displacement of the second swing unit, adjustment can be performed more easily than a method of simultaneously moving the two axes to determine the operation positions (the A operation position to the D operation position).

In the optical path control device according to the present embodiment, the drive circuit 16 can stop the swing unit 12A at the first angle (the first inclination angle) D1 or the second angle (the second inclination angle) D2 by maintaining the current value at a positive or negative peak current value and can stop the swing unit 12A at the reference angle D0 that is an intermediate value between the first angle D1 and the second angle D2 by maintaining the current value at the current value 0. Therefore, the control of the actuators 25 and 26 can be simplified.

In the optical path control device according to the present embodiment, the drive signal of the current value applied to the first actuator 25 and the second actuator 26 by the drive circuit 16 has a waveform formed in a staircase shape. Therefore, since the first actuator 25 and the second actuator 26 are driven by the drive signal having the waveform formed in the staircase shape, the first swing unit 21 and the second swing unit 22 can be accurately stopped in predetermined positions.

In addition, the display device according to the present embodiment includes the optical path control device 10 and the irradiation device 100 that irradiates the swing unit 12A with the light L. Therefore, by including the optical path control device 10, the display device 1 can reduce the power consumption of the actuators 25 and 26 and simplify the control of the actuators 25 and 26.

The display device according to the present embodiment includes the swing unit 12A including the optical member (the optical unit) 20 on which light is made incident, the actuator 12B capable of swinging the swing unit 12A, the video signal processing circuit (the processing unit) 160 that controls the display elements 106R, 106G, and 106B based on image data, and the drive circuit (the drive unit) 16 that drives the actuator 12B in synchronization with the processing of the video signal processing circuit 160. The video signal processing circuit 160 controls the display elements 106R, 106G, and 106B such that a part of the first subframe group among the plurality of subframes obtained by dividing the first frame into a plurality of frames is sequentially displayed within a time for displaying the first frame of the image data and controls the display elements 106R, 106G, and 106B such that a second subframe group different from the part of the first subframe group among a plurality of subframes obtained by dividing the second frame into a plurality of frames is sequentially displayed within a time for displaying the second frame following the first frame.

With the display device in the present embodiment, a part of the first subframe group is sequentially displayed within the time for displaying the first frame and a part of the second subframe group different from the first subframe group is sequentially displayed within the time for displaying the second frame. Therefore, a period in which the subframe group is displayed is not extremely reduced and it is possible to cause the display elements 106R, 106G, and 106B to appropriately display the subframe group. As a result, by securing a time for displaying a predetermined gradation, it is possible to display more pixels than the number of pixels of the display elements 106R, 106G, and 106B while securing gradation performance and suppress deterioration in the resolution of an input video and display the video.

In the display device according to the present embodiment, the first subframe group is a first front subframe and a first rear subframe configured by pixels respectively corresponding to a first pixel position and a fourth pixel position among the four kinds of pixels configuring the first frame and the second subframe group is a second front subframe and a second rear subframe configured by pixels respectively corresponding to a second pixel position and a third pixel position among the four kinds of pixels configuring the second frame. Therefore, for example, image data having 8K resolution can be appropriately displayed on the display device 1 having 4K resolution. It is possible to suppress degradation in the resolution of a displayed video while securing gradation performance.

In the display device according to the present embodiment, when continuously displaying the subframe groups, the video signal processing circuit 160 controls the display elements 106R, 106G, and 106B such that pixel positions of frames corresponding to pixels of adjacent subframes to be continuously displayed are different. Therefore, a time for displaying predetermined gradation can be easily secured.

In the display device according to the present embodiment, when continuously displaying a plurality of frames, the video signal processing circuit 160 controls the display elements 106R, 106G, and 106B such that respective subframe groups corresponding to adjacent frames are different. Therefore, a time for displaying predetermined gradation can be easily secured.

In an optical path control method according to the present embodiment, when a drive signal for setting a current value to a preset predetermined current value is applied to one of the first actuator 25 and the second actuator 26 to maintain the first swing unit 21 or the second swing unit 22 in an inclined position inclined with respect to a reference position, a drive signal for setting the current value to 0 is applied to the other to maintain the first swing unit 21 or the second swing unit 22 in the reference position. Therefore, the power consumption of the actuators 25 and 26 can be reduced and the control of the actuators 25 and 26 can be simplified.

Note that, in the embodiment explained above, the configuration is adopted in which the optical member 20 is supported by the first swing unit 21, the first swing unit 21 is swingably supported by the second swing unit 22, and the second swing unit 22 is swingably supported by the supporting unit 27. However, the configuration is not limiting. For example, a first optical path control device configured by supporting the first optical member on the first swing unit and swingably supporting the first swing unit on the first supporting unit and a second optical path control device configured by supporting the second optical member on the second swing unit and swingably supporting the second swing unit on the second supporting unit may be configured to overlap each other in a light irradiation direction.

Although the optical path control device 10 according to the present disclosure is explained above, the present disclosure may be implemented in various different modes other than the embodiment explained above.

The components of the illustrated optical path control device 10 are functionally conceptual and may not always be physically configured as illustrated. That is, specific forms of the devices are not limited to the illustrated forms. All or a part the devices may be functionally or physically distributed or integrated in any unit according to processing loads, use situations, and the like of the devices.

The components of the optical path control device 10 are implemented by, for example, a program loaded in a memory as software. In the embodiment explained above, the components are explained as the functional blocks implemented by cooperation of the hardware or software.

That is, these functional blocks can be implemented in various forms by only the hardware, only the software, or the combination of the hardware and the software.

The components explained above include components that can be easily assumed by those skilled in the art and substantially the same components. Further, the components explained above can be combined as appropriate. Various omissions, substitutions, or changes of the components can be made without departing from the gist of the present disclosure.

The optical path control device, the display device, and the optical path control method of the present disclosure can be applied to, for example, an image display device.

According to the present disclosure, the power consumption of the actuator can be reduced and the control for the actuator can be simplified.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An optical path control device comprising:

a swing unit including an optical unit on which light is made incident, a first swing unit that supports the optical unit, and a second swing unit that swingably supports the first swing unit;

a first actuator that swings the swing unit centering on a first swing axis;

a second actuator that swings the swing unit centering on a second swing axis intersecting the first swing axis; and a drive unit that applies a drive signal of a current value to the first actuator and the second actuator, wherein when applying a drive signal for setting the current value to a preset predetermined current value to one of the first actuator and the second actuator to maintain the first swing unit or the second swing unit in an inclined position inclined with respect to a reference position, the drive unit applies a drive signal for setting the current value to 0 to another to maintain the first swing unit or the second swing unit in the reference position, and the drive unit applies a ½ current value of a peak current value for a ½ period of a period of natural vibration of the swing unit and, thereafter, maintains the current value at the peak current value or a current value 0.

2. The optical path control device according to claim 1, wherein the first swing axis and the second swing axis are arranged to be orthogonal to each other and arranged to be shifted by 45 degrees with respect to an array direction of pixels of the optical unit.

3. The optical path control device according to claim 1, wherein the drive signal of the current value applied to the first actuator and the second actuator by the drive unit has a waveform formed in a staircase shape.

4. The optical path control device according to claim 1, wherein the drive unit can stop the swing unit at a first inclination angle or a second inclination angle by maintaining the current value at the peak current value of positive or negative polarities and can stop the swing unit at the reference position intermediate between the first inclination angle and the second inclination angle by maintaining the current value at the current value 0.

5. The optical path control device according to claim 1, wherein the drive signal of the current value applied to the first actuator or the second actuator by the drive unit has a waveform formed in a staircase shape.

6. A display device comprising:

the optical path control device according to claim 1; and an irradiation device that irradiates the optical unit with light.

7. The display device according to claim 6, further comprising a processing unit that controls a display element based on image data, wherein the drive unit drives the first actuator or the second actuator in synchronization with processing of the processing unit, and the processing unit controls the display element such that a part of a first subframe group among a plurality of subframes obtained by dividing a first frame into a plurality of frames is sequentially displayed within a time for displaying the first frame of the image data, and controls the display element such that a second subframe group different from the part of the first subframe group among a plurality of subframes obtained by dividing a second frame into a plurality of frames is sequentially displayed within a time for displaying the second frame following the first frame.

8. The display device according to claim 7, wherein the first subframe group is a first front subframe and a first rear subframe configured by pixels respectively corresponding to a first pixel position and a fourth pixel position among four kinds of pixels configuring the first frame, and the second subframe group is a second front subframe and a second rear subframe configured by pixels respectively corresponding to a second pixel position and a third pixel position among four kinds of pixels configuring the second frame.

9. The display device according to claim 7, wherein the processing unit controls the display element such that pixel positions of the frames corresponding to pixels of adjacent subframes to be continuously displayed are different when the subframe group is continuously displayed.

10. The display device according to claim 7, wherein the processing unit controls the display element such that the respective subframe groups corresponding to the adjacent frames are different when the plurality of frames are continuously displayed.

11. An optical path control method for controlling an optical path by applying a drive signal of a current value to a first actuator that swings, centering on a first swing axis, a first swing unit supporting an optical unit on which light is made incident and a second actuator that swings, centering on a second swing axis intersecting the first swing axis, a second swing unit that swingably supports the first swing unit, the optical path control method comprising, when applying a drive signal for setting the current value to a preset predetermined current value to one of the first actuator and the second actuator to maintain the first swing unit or the second swing unit in an inclined position inclined with respect to a reference position, applying a drive signal for setting the current value to 0 to another to maintain the first swing unit or the second swing unit in the reference position, and applying a ½ current value of a peak current value for a ½ period of a period of natural vibration of the swing unit and, thereafter, maintains the current value at the peak current value or a current value 0.

* * * * *